United States Patent
Hughes et al.

(10) Patent No.: US 9,381,426 B1
(45) Date of Patent: Jul. 5, 2016

(54) SEMI-AUTOMATED DIGITAL PUPPETRY CONTROL

(71) Applicant: University of Central Florida Research Foundation, Inc., Orlando, FL (US)

(72) Inventors: Charles E. Hughes, Maitland, FL (US); Lisa A. Dieker, Oviedo, FL (US); Arjun Nagendran, Orlando, FL (US); Michael C. Hynes, Oviedo, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 324 days.

(21) Appl. No.: 14/216,488

(22) Filed: Mar. 17, 2014

Related U.S. Application Data

(60) Provisional application No. 61/790,467, filed on Mar. 15, 2013.

(51) Int. Cl.
    *G06T 17/00* (2006.01)
    *A63F 13/219* (2014.01)
    *G06F 3/01* (2006.01)

(52) U.S. Cl.
    CPC ............... *A63F 13/04* (2013.01); *G06F 3/011* (2013.01); *G06F 3/017* (2013.01)

(58) Field of Classification Search
    None
    See application file for complete search history.

(56) References Cited

U.S. PATENT DOCUMENTS

| | | | |
|---|---|---|---|
| 2004/0190775 A1* | 9/2004 | Miller | G06K 9/00208 382/190 |
| 2011/0175918 A1* | 7/2011 | Liu | G06T 13/40 345/473 |
| 2013/0002669 A1* | 1/2013 | Rhee | G06T 13/40 345/420 |

OTHER PUBLICATIONS

Nagendran et al., Amities: Avatar-Mediated Interactive Training and Individualized Experiences System. Proceedings of 19th ACM Virtual Reality Software & Technology (VRST). 2013. Singapore: 143-152.

Nagendran et al., Continuum of Virtual-Human Space: Towards Improved Interaction Strategies for Physical-Virtual Avatars. ACM SIGGRAPH VRCAI. 2012. Singapore: 135-142.

Rudolph et al., Debriefing with Good Judgment: combining rigorous feedback with genuine inquiry. Anesthesiology Clinics. 2007. vol. 25: 361-376.

Mapes et al., Geppetto: An Environment for the Efficient Control and Transmission of Digital Puppetry. R. Schumaker (Ed.): Virtual and Mixed Reality, Part II: HCII. LNCS. 2011. vol. 6774: 270-278.

Sturman. Computer Puppetry. IEEE Computer Graphics and Applications. 1998. vol. 18 (No. 1): 38-45.

(Continued)

*Primary Examiner* — Jason Yeh
(74) *Attorney, Agent, or Firm* — Postermak Blankstein & Lund LLP

(57) ABSTRACT

A low-cost, low-demand (physical and cognitive) interface for puppeteers that allows them to easily participate in the control of verbal and non-verbal activities of a set of virtual characters or avatars. The invention further provides a low-cost, unencumbered interface for participants that allows them to employ both natural movement and also verbal and non-verbal interaction with virtual characters. A network protocol supports real-time remote interaction even when dealing with relatively poor network connections; and an integrated after-action review system supports trainers in the processes of tagging and commenting on events, subsequently using these to assist reflection on the part of participants.

23 Claims, 13 Drawing Sheets

(56) References Cited

OTHER PUBLICATIONS

Rizzo et al., Development and clinical results from the Virtual Iraq exposure therapy Application for PTSD. Proceedings of Virtual Rehabilitation International Conference. Haifa, Israel. Jun. 2009: 8-15.

Trowbridge and Stapleton. Melting the Boundaries between Fantasy and Reality. Computer. 2009. vol. 42 (No. 7): 57-62.

Dieker et al., Implications of Mixed Reality and Simulation Technologies on Special Education and Teacher Preparation. Focus on Exceptional Children. 2008. vol. 40: 1-20.

Mazalek et al., Giving yourself to the game: transferring a player's own movements to avatars using tangible interfaces. Proceedings of the 2009 ACM SIGGRAPH Symposium on Video Games. New Orleans, Louisiana. 2009: 161-168.

Okita et al., Mere belief in social action improves complex learning. Proceedings of the 8th International Conference for the Learning Sciences—vol. 2. Utrecht, Netherlands. 2008: 132-139.

Kessler et al., Evaluation of the CyberGlove as a Whole-Hand Input Device. ACM Transactions on Computer-Human Interactaction. 1995. vol. 2 (No. 4): 263-283.

Lee et al., Interactive Control of Avatars Animated with Human Motion Data. Proceedings of the 29th Annual Conference on Computer Graphics and Interactive Techniques (SIGGRAPH 2002). 2002. San Antonio: 491-500.

Razer Hydra. Wikipedia. Date Accessed Jun. 17, 2014. http://en.wikipedia.org/wiki/Razer_Hydra.

Shotton et al., Real-time human pose recognition in parts from single depth images. Proceedings of 24th IEEE Conference on Computer Vision and Pattern Recognition (CVPR). 2011: 1297-1304.

Ekman. Facial expression and emotion. American Psychologist. 1993. vol. 48 (No. 4): 384-392.

Ferri and Connor. Tools of exclusion: Race, disability, and (Re)segregated education. Teachers College Record. 2005. vol. 107 (No. 3): 453-474.

McKown and Weinstein. Teacher expectations, classroom context, and the achievement gap. Journal of School Psychology. 2008. vol. 46: 235-261.

Lou and Chai. Example-Based Human Motion Denoising. IEEE Transactions on Visualization and Computer Graphics. vol. 16 (No. 5): 870-879.

Nelson and Roberts. Ongoing reciprocal teacher-student interactions involving disruptive behaviors in general education classrooms. Journal of Emotional & Behavioral Disorders. 2000. vol. 8 (No. 1): 27-37, 48.

Picower. The unexamined whiteness of teaching: How white teachers maintain and enact dominant racial ideologies. Race, Ethnicity & Education. 2009. vol. 12 (No. 2): 197-215.

Rodriguez. Latino school dropout and popular culture: Envisioning solutions to a pervasive problem. Journal of Latinos & Education. 2008. vol. 7 (No. 3): 258-264.

Stamps and Bohon. Educational attainment in new and established Latino metropolitan destinations. Social Science Quarterly. 2006. vol. 87: 1225-1240.

Rhody and Heppler. Controlling the Dynamics of Mass Capture by a Single Flexible Link. IEEE International Conference on Robotics and Automation (ICRA). IEEE Com-put. Soc. Press. 1993: 496-501.

Wirth et al., Interactive Performance: Dramatic Improvisation in a Mixed Reality Environment for Learning. R. Shumaker (Ed.): Virtual and Mixed Reality, Part II, HCII 2011, LNCS. vol. 6774: 110-118.

Powers et al., Comparing a computer agent with a humanoid robot. ACM/IEEE international Conference on Human-Robot Interaction (HRI). Arlington, VA. 2007: 145-152.

Moeslund et al., A Survey of Advances in Vision-Based Human Motion Capture and Analysis. Computer Vision and Image Understanding. 2006. vol. 104: 90-126.

Bainbridge et al., The Effect of Presence on Human-Robot Interaction. 17th IEEE International Symposium on Robot and Human Interactive Communication. 2008: 701-706.

Breazeal and Scassellati. Robots that imitate humans. Trends in Cognitive Sciences. 2002. vol. 6 (No. 11): 481-487.

Coradeschi et al., Human-Inspired Robots. IEEE Intelligent Systems. 2006. vol. 21 (No. 4): 74-85.

Epstein. My Date with a Robot. Scientific American Mind. 2006. vol. 17 (No. 3): 68-73.

Featherstone and Orin. Robot Dynamics: Equations and Algorithms. Proceedings of the 2000 IEEE International Conference on Robotics and Automation (ICRA). San Francisco, CA. 2000. vol. 1: 826-834.

Mahanta and Bhagat. Adaptive Fuzzy Self-learning Controller for Robotic Manipulators. IEEE Conference on Robotics, Automation and Mechatronics. 2006: 1-6.

Holte et al., Human Pose Estimation and Activity Recognition From Multi-View Videos: Comparative Explorations of Recent Developments. IEEE Journal of Selected Topics in Signal Processing. 2012. vol. 6 (No. 5): 538-552.

Kidd and Breazeal. Robots at Home: Under-standing Long-Term Human-Robot Interaction. IEEE/RSJ International Conference on Intelligent Robots and Systems (IROS). Nice, France. 2008: 3230-3235.

Lambrechts et al., Trajectory Planning and Feedforward Design for Electrome-chanical Motion Systems. Control Engineering Practice. 2005. vol. 13: 145-157.

Lincoln et al., Animatronic Shader Lamps Avatars. Virtual Reality. 2011. vol. 15: 225-238.

Pessen. A New Look at PID-Controller Tuning. Journal of Dynamic Systems, Measurement, and Control. 1994. vol. 116: 553-557.

Ekman. Universals and cultural differences in facial expressions of emotion. Nebraska Symposium on Motiation. 1971. vol. 19: 207 - 283.

Bailenson and Blascovich. Avatars. Berkshire Encyclopedia of Human-Computer Interaction. 2004: 64-68.

Lopez et al., Cross cultural training through digital puppetry. Advances in Design for Cross-Cultural Activities: Part 1. 2013. Chapter 25: 247-256.

Dieker et al., The use of virtual and simulated teaching and learning environments: Inviting gifted students into science, technology, engineering, and mathematics careers (STEM) through summer partnerships. Gifted Education International. 2012. vol. 28 (No. 1): 96-106.

Erbiceanu et al., Synthesizing Virtual Character Behaviors From Interactive Digital Puppetry. Non-Verbal communication in Virtual Worlds. Eds. J. Tanenbaum, M. Nixon & M. Seif el-Nasr. ETC Press, Carnegie-Mellon. 2014. Chapter 16: 269-287.

Hughes and Mapes. "Mediated dialogues through Multiple Networked Avatars," Journal of Immersive Education. iED 2012 Proceedings. ISSB 2325-4041. 2012: 10-18.

Nagendran et al, A Unified Framework for Individualized Avatar-Based Interactions. Presence. 2014. vol. 23 (No. 2): 109-132.

Dieker et al., TLE TeachLivE™: Using Technology to Provide Quality Professional Development in Rural Schools. American Council for Rural Special Educators, Eds. B. Collins & B. Ludlow, in press.

* cited by examiner

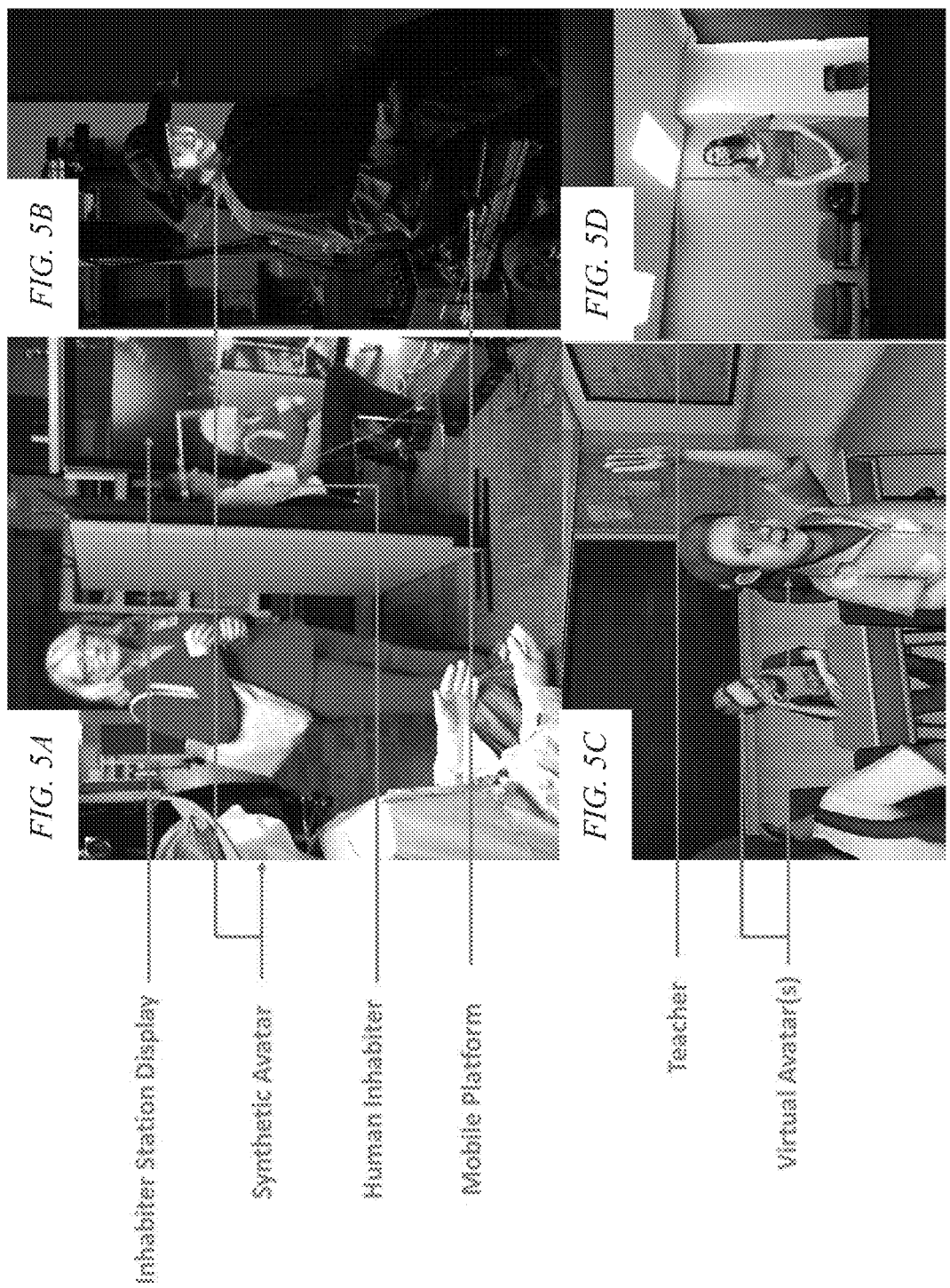

SEMI-AUTOMATED DIGITAL PUPPETRY CONTROL

CROSS-REFERENCE TO RELATED APPLICATIONS

This nonprovisional application is a continuation of and claims priority to provisional application No. 61/790,467, entitled "Semiautomated Digital Puppetry Control", filed Mar. 15, 2013 by the same inventor, the entirety of which is incorporated herein by reference.

BACKGROUND OF THE INVENTION

1. Field of the Invention

This invention relates, generally, to computer simulations. More specifically, it relates to providing interactive semi-automated anthropomorphic avatars that uses a human-in-the-loop paradigm to audibly and visually engage an end user (called a participant) for training and evaluation purposes.

2. Brief Description of the Related Art

Digital puppetry refers to the interactive control of virtual characters. The artistry of using a human to control the actions of animated characters in real-time has been employed for several decades in a number of venues including television and location-based entertainment. More recently, these techniques have found application in interactive networked simulations.

By affording responsive and adaptive behaviors while operating through the changeable context of an invented digital character, puppetry greatly increases the effectiveness of interactive experiences. Not unexpectedly, these benefits come with demanding requirements both from the puppeteers and from the technical aspects of projecting the simulation. From the puppeteer, there is the cognitive load associated with rapid switches between puppets; maintaining individual puppet behaviors during switches; following training scenario scripts; operating scenario specific controls; and operating puppet specific behavior controls. From a technical aspect, there is the need to reliably and efficiently capture and transmit behaviors over a long haul network; the necessity to achieve this transmission even in the presence of limited resources, including bandwidth and computational power; and the requirement to articulate these actions at the client site, providing smooth interactive performance.

One of the most prevalent and affordable examples of projected puppetry applications is the networked first person shooter game where individual players log in online to control a puppet that can do a fixed set of behaviors such as walk, run, duck, jump, punch, kick, aim and shoot using devices such as game controllers, keyboards and mice. While the process of pressing a button to control a character may not be initially intuitive, devoted players to these games have become quite adept at using these controls under the pressure of competitive game play. The control data being transmitted over long-haul worldwide networks from the buttons and dual axis joysticks found in typical controllers is insignificant compared to the incoming game state stream or the streaming VoIP that players use to collaborate during play.

The ability for players to collaborate in teams led to the emergence of machinima where remote participants could interact with each other to create short playful movies where each player acted out a predefined role, while the results were recorded through the game camera. Though the control model allowed for small efficient network streaming, with the ability to run, walk, duck, jump, aim and shoot it was fairly clear that the game characters lacked the more complex facial expressions and body language to do live acting.

In an online social networking game, such as SECOND LIFE, an array of user-playable puppet animations are provided by default with the option of players increasing this set with their own custom animations. These are used much like emoticon symbols embedded in a text document. While this is an improvement over the FPS game control by showing both facial emotion and body language, even if a puppeteer were able to master such a sizable abstract mapping, the performance still lacks the subtle hand and body motions used to communicate non-verbally and to punctuate speech.

Accordingly, what is needed is a more effective system and methodology for digital puppeteering that can capture detailed, complex facial expressions and hand and body motions. However, in view of the art considered as a whole at the time the present invention was made, it was not obvious to those of ordinary skill in the field of this invention how the shortcomings of the prior art could be overcome.

The following references are incorporated herein by reference in their entireties: Nagendran A, Pillat R, Kavanaugh A, Welch G, Hughes C E. (2013). AMITIES: Avatar-Mediated Interactive Training and Individualized Experiences System. *Proceedings of 19th ACM Virtual Reality Software & Technology (VRST)* 2013, Singapore, 143-152; and Nagendran A, Pillat R, Hughes C E, Welch G. (2012). Continuum of Virtual-Human Space: Towards Improved Interaction Strategies for Physical—Virtual Avatars. ACM SIGGRAPH VRCAI 2012, Dec. 2-4, 2012, Singapore, 135-142. Where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein. For instance, one can use the paradigm for remote tele-presence, where an avatar is used as a stand-in for a person operating it (referred to as a surrogate).

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY

The long-standing but heretofore unfulfilled need for an improved, low-bandwidth but smooth digital puppeteering system is now met by a new, useful, and nonobvious invention.

In an embodiment, the current invention is a system for avatar display and interaction using a gesture-based paradigm. The system includes a downloadable or web-accessible software application executable on an electronic computing device, and an electronic visual display and/or set of physical manifestations that output audio and video of digital characters or avatars. A storage module receives and stores a basis set of poses (facial and body), in the form of an array of microposes, on the software application, where the microposes are unique to a specific avatar. The basis set provides microposes that are end poses (positions and facial appearances) of the avatar without the specification of transitions between each micropose. Moreover, the microposes comprising an avatar's basis set are sufficient in combination or singularly to provide the range of expressiveness required for that avatar's unique personality and functions. A pose indicator has a spatial position corresponding to each micropose. Spatial positions that do not directly correspond to a micropose specify micropose blends using various possible approaches including closest micropose, interpolation between the closest two microposes and interpolation across all nearby microposes. An access module accesses the stored microposes as a result of the pose indicator sending input data corresponding to a first indicating position. When the microposes are accessed, a corresponding first resulting position of the avatar is presented on the visual display, where the first resulting position corresponds to a first micropose or a blend of two or more microposes. The choice between a single micropose and a blend of microposes is dependent on a given application of the micropose paradigm. The access module further accesses the stored microposes as a result of the pose indicator sending input data in a second indicating position. When the microposes are accessed, a corresponding second resulting position of the avatar is presented on the visual display, where the second resulting position corresponds to a second micropose, or a blend of two or more microposes. The first and second resulting positions have a transition action therebetween presented on the visual display, where the transition action does not directly correspond to any spatial position of the pose indicator. When the avatar is in the first resulting position, the first micropose, or a pose synthesized from a weighted blend of two or more microposes, has full weight; similarly, when the avatar is in the second resulting position, the second micropose, or a pose synthesized from a blend of two or more microposes, has full weight. Thus, when the avatar is in transition between the two resulting positions, there is a partial weight of the first position (single micropose or combination of microposes) and a partial weight of the second position (single micropose or combination of microposes). During transition, the weights on the first and second vary in such a manner as to result in a smooth transition and one that avoids visual implausibility (e.g., an avatar's hand going through its body) and physical impossibility (e.g., intermediate states that are not possible when the avatar has a physical manifestation, such as a robot that must adhere to certain constrained movements). The system blends sets of microposes, minimizes network demand or traffic for digital puppeteering, and maximizes quality of the digital characters or avatars on the electronic visual display.

The first and second indicating positions may not directly match the first and second resulting positions, respectively.

The pose indicator or some other selection mechanism chooses the avatar prior to placement in an indicating position.

The actual blending of microposes to create a target pose can be expressed as a closed-form function; or one interpolated from a tabular representation; or one influenced by visual plausibility and physical possibility; or even one influenced by force feedback from the target object's environment, e.g., by physical constraints due to other objects in the target space. The invention sets no a priori constraints on the blending process.

The avatar may have an in-focus state and an out-of-focus state. The in-focus state occurs when the avatar is selected by the pose indicator. The out-of-focus state occurs when the avatar is not selected by the pose indicator. In this case, the system includes an artificial intelligence module that automatically instructs the avatar to perform agent-based behaviors when the avatar is in the out-of-focus state.

The system may further include a camera-based device for capturing the first and second indicating positions of the pose indicator for conversion into the first and said resulting positions, respectively, of the avatar.

The transition action may occur at a rate that is based on a time period of the pose indicator in the first and second indicating positions or on a time period of change between the first and second indicating positions.

The pose indicator may include a motion sensing input device that detects the first indicating position of the pose indicator and converts the first indicating position to the first resulting position of the avatar. The first resulting position corresponds to the first micropose or blend of microposes. The motion sensing input device can further detect the second indicating position of the pose indicator and converts the second indicating position to the second resulting position of the avatar. The second resulting position corresponds to the second micropose or blend of microposes.

The pose indicator may be a motion and orientation detection controller. In a further embodiment, the motion and orientation detection controller has six (6) degrees of freedom in order to control the avatar in three-dimensional space, or to use orientation as a secondary input for pose variations, e.g., waving a raised hand.

The pose indicator may be a hybrid system, e.g., one using some combination of vision-based/optical, laser, GPS, IMU or magnetic tracking, for capturing the first and second indicating positions and orientations of the pose indicator for conversion into the first and said resulting positions, respectively, of the avatar.

The avatar may be synthetic or physical. In a further embodiment, the physical avatar has an optimized pan axis and an optimized tilt axis. In yet another embodiment, the physical avatar is fully robotic. The robotic avatar may consist of several independently controllable degrees of freedom with actuation mechanisms, including, but not limited to, electric motors, pneumatics, and passive/active compliance elements. Such avatars may also have the capability to navigate and interact physically with objects in the environment. Physical avatars may also have constrained movements based on constraints related to their comprising technologies, designs or even the environments in which they are operating.

In a separate embodiment, rather than the invention being a system, the invention is a non-transitory tangible computer-readable medium having computer-executable instructions for performing a method by running a software program on a computing device. The computing device operates under an operating system, and the method includes issuing instructions from the software program for avatar display and interaction using a gesture-based paradigm. The instructions include operating the system in a manner substantially as described previously.

In a separate embodiment, the current invention is a system for avatar interaction through a gesture-based paradigm. The system includes an electronic visual display and/or a set of physical manifestations of one or more computer simulated avatars. The visual display and physical manifestations present both video and audio of the avatars before a participant (often a trainee). One or more motion sensing input devices track the movements and gestures of the participant. A digital video capture device monitors the movements and gestures of the participant and generates an output video stream. Participant movement perimeters in front of the visual display and/or physical manifestations define the boundaries in which the motion sensing input device is capable of tracking the participant. A non-transitory, computer readable media stores instructions to modify the appearance and behaviors of the avatars in a manner that is responsive to movements of the participant detected by the motion sensing input device(s). This spatial relationship may be used to visually alter the first electronic visual display or affect the behaviors of the avatars, whether they be virtual or physical. An additional electronic visual display of both the avatars and the output video stream is presented before an interactor (puppeteer). This view of the avatars is consistent with that observed by the participant. An additional motion sensing input device tracks the movements and gestures of the interactor. An additional non-transitory, computer readable media stores instructions to modify the appearance of the in-focus avatar responsive to movement and gestures of the interactor.

In a separate embodiment, the current invention is a system that supports an unlimited number of observers, some of which are passive and some of which are active. The system supporting observers includes an electronic visual display that presents both video and audio of the avatars exactly as seen by the participant. In the case of active observers, also called trainers, the visual display has an added window through which the trainer can see the participant. This is provided to assist the trainer in determining appropriate feedback to the participant. It can also be used by a trainer who is a subject-matter expert (SME) in providing immediate feedback to the interactor, where such feedback is appropriate to the training application.

The system can optionally include additional electronic visual displays that can be used to observe the avatars and, optionally, the participant. Each such observer station can be employed for voyeuristic learning or by coaches who facilitate reflection and debriefing activities.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 5A shows an image of an inhabiter station display and human inhabiter.

FIG. 5B shows the physical manifestation (robotic) of the synthetic avatar on a mobile platform (wheelchair) to allow motion within the environment.

FIG. 5C shows a small class of virtual middle school children.

FIG. 5D shows a teacher addressing the class in FIG. 5C.

DETAILED DESCRIPTION

Figure 1A:
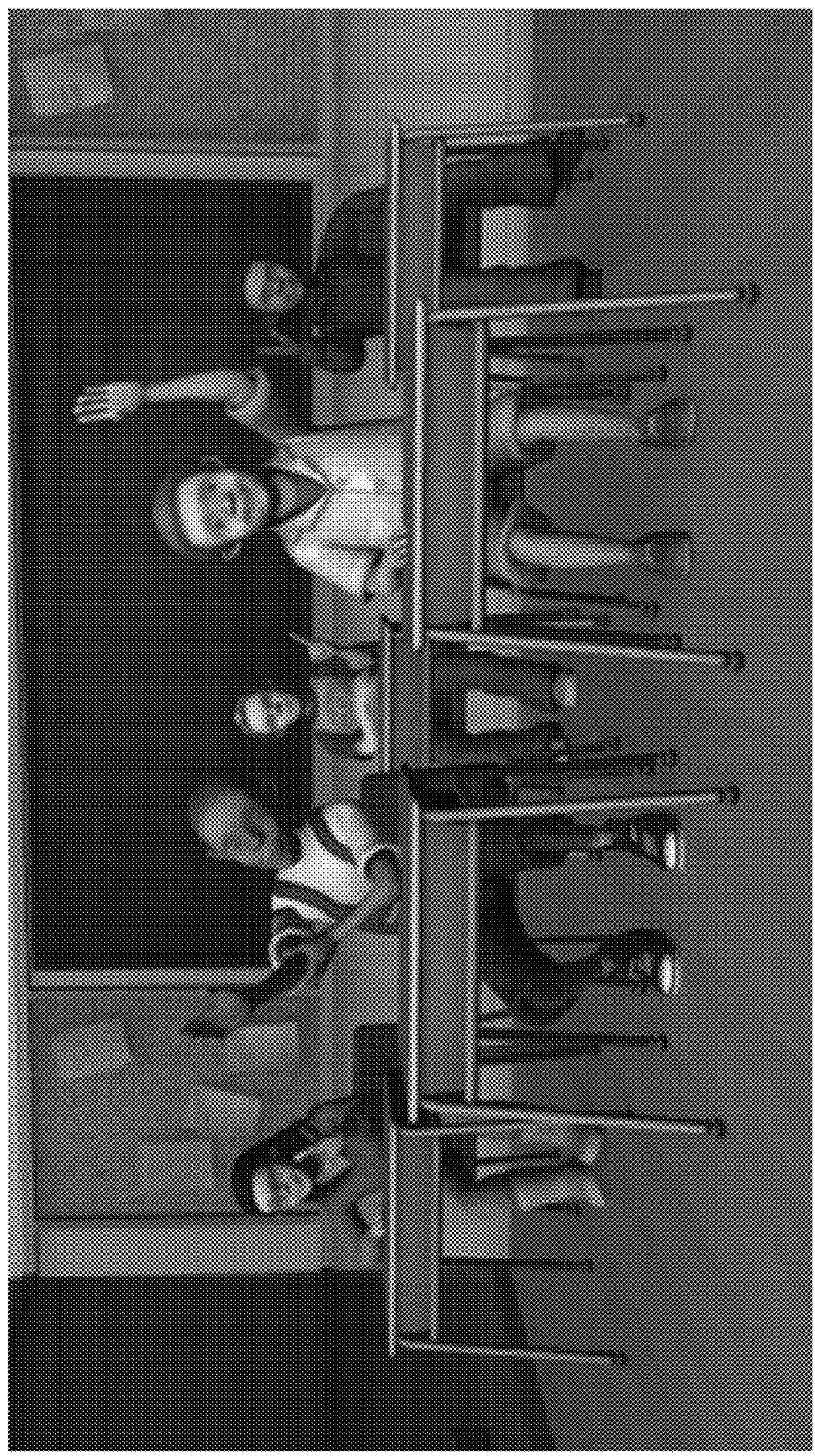
FIG. 1A is a computer simulation of a classroom children, all in an attentive state.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

In an embodiment, a system was developed for providing pre-service and in-service teachers the opportunity to learn teaching skills in an urban middle school classroom. In this scenario, the exemplary system included five (5) digital puppets, each with its own prototypical behavior (see FIGS. 1A and 1B). Teachers used the virtual classroom to practice their skills and style without placing "real" students at risk during the learning process. Overall, the concepts developed and tested in this environment were based on the hypothesis that performance assessment and improvement are most effective in contextually meaningful settings.

In the design of this embodiment, the puppets (avatars) were always seated or standing at desks which permitted focus primarily on upper body motions and facial gestures.

In another embodiment/study, an avatar project utilized digital puppets to practice debriefing skills. The scenario had three puppets: one male nurse, one female emergency room physician and one male anesthesiologist. In this scenario, the participant (functioning as a trainee) was to practice successful debriefing skills with the trained interactor operating through the three puppets.

In order to minimize the limitations from live motion capture in this embodiment/study, a micropose system was designed where each puppet contained a set of full body end poses that were characteristic of how each puppet might communicate through facial, hand and body posture. An infrared camera motion capture system is used to track the interactor's head. A RAZER HYDRA is used to track the interactor's hands (positions and orientations). The HYDRA also contains a set of buttons and a joy stick on each hand's controller. In this implementation, each avatar has a basis set of poses. This basis set provides a collection of microposes from which more complex poses can be formed. A calibration process presents each characteristic puppet pose to the interactor who then chooses a positions for both hands that he or she can easily associate with that pose. A database of their real world hand locations and the associated poses is thereby built, one per interactor.

The end result is a puppet designed to exhibit only culturally appropriate gestures where these gestures can be controlled seamlessly using 3D locators held in each of the interactor's hands while the interactor moves the puppet's head directly by their own head movement. Since the puppet poses and the controlling hand locations are uniquely mapped, this system is almost as intuitive as raw motion capture, while allowing poses, such as head down and arms crossed, that often lead to undesirable artifacts in those systems.

The above implementation improves the speed of puppeteering by feeding a much smaller vector of data points (two hand locations) into the animation database. This addressed issues in previous studies where motion capture was stored in a database of animations and full motion capture was used to map into this database in real-time. In addition, all aspects of the pose, including hand and finger postures, could be included where the raw motion capture system had only flat unexpressive hands.

Another clear benefit of this system over raw motion capture was the realization that only the poses and their relative weight need be communicated over the Internet to describe the puppet state.

In addition to body poses, this system has the ability to create weighted blends involving combinations of facial poses. Having multiple poses mixing over time allows the system to transcend the plastic look often associated with digital puppets, thereby bringing the character to life.

The primary gains of this approach to puppetry over full-body capture have been the reduction in noise that arises from tracking a large number of points; a reduced hardware footprint; and reduction in overall hardware cost and a significant reduction in data that must be transmitted. Additionally, the approach greatly reduces the cognitive and physical load on puppeteers, especially when they must be concerned about varying cultures to which this must be delivered—non-verbal cultural awareness exists at the receiving end not at the puppetry end.

DEFINITIONS

After-action review: This term is used herein to refer to a portion of training that follows an experience, and allows the participant, who is operating as a trainee, to reflect on his or her performance, often with the aid of a trainer.

Agent: This term is used herein to refer to a programmatically (computer) controlled digital character or avatar. See "out-of-focus character."

Avatar: This term is used herein to refer to a graphical representation of an individual or operator's alter ego. As used herein, an avatar is a digital character controlled by the actions of an interactor being the individual or operator. See "in-focus character."

Basis set: This term is used herein to refer to a set of objects that can be combined in some weighted fashion to produce any element in some desired specificity. As used herein, a basis set is a (typically small) set of microposes (see micropose) that can be combined through the blending of weights to create a desired pose or action (body or facial).

Front room: This term is used herein to refer to a component of the system where the participant experiences the training or rehearsal activity.

Inhabiter or interactor: This term is used herein to refer to an individual or trainer who controls the avatars for display in front of the participant.

Inhabiter or Interactor station: This term is used herein to refer to a computer station at which an inhabiter or interactor controls some set of avatars and/or agents.

In-focus character: This term is used herein to refer to a digital or real character/avatar that is currently under control of an interactor and is thus an avatar of that interactor.

Localized representation: This term is used herein to refer to some representation of an action or pose that carries a desired connotation within some regional culture.

Micropose: This term is used herein to refer to a facial or body pose that is part of a basis set. Microposes are used to simplify ultimate character/avatar actions and provide a lightweight network transmission of poses and pose transitions.

Out-of-focus character: This term is used herein to refer to a digital character that is not currently controlled by an interactor. Such a character rather exhibits programmed behaviors, for example through artificial intelligence techniques, and is thus an agent.

Participant: This term is used herein to refer to an individual or entity interacting with, but not controlling, the avatars.

Tagging: This term is used herein to refer to a process of associating tags with events in a video/audio stream. These tags are employed in analysis, review, reflection, and archiving.

Trainee: This term is used herein to refer to participant or entity experiencing or receiving an experience designed for training or activity rehearsal.

Cross Cultural Training

A long felt need exists for the use of digital puppetry to assist individuals and organizations to better understand people of other cultures and to discover recondite biases that may be negatively affecting their abilities to assess and communicate with diverse individuals. As such, employment of digital puppetry according to the present invention is primarily centered on using it to place people in unfamiliar and often uncomfortable situations. The purpose of these scenarios is to achieve positive outcomes, even when the short-term goal is to bring about discomfort. Obvious uses of puppetry in cross-cultural scenarios include preparation for deployment into a foreign country as a soldier or businessperson. Less obvious is preparation for a career as a police officer, counselor, or teacher, the latter being the central non-limiting application discussed herein. Perhaps even less obvious is employment for prolonged exposure therapy after traumatic events, whether in war or in civilian life.

Characters that exhibit believable, natural behaviors are key elements in virtual experiences designed to trigger emotional/empathic responses. Although it is possible to script expressive behaviors for many circumstances, direct interactivity with the participant is a problem for computational approaches, when conversation is open-ended. This complex level of communication seems presently doable only by humans. The intricacies of human-to-human interaction include non-verbal as well as verbal communication, the latter being necessary but not sufficient to create an aura of believability in virtual environments. In fact, nonverbal cues are essential to the message a person conveys, and are nuanced as much by culture, as are language and dress. Preparing a person for another culture, understanding one's recondite biases in unfamiliar contexts, or bringing back memories that are couched in another culture requires more than scenery, clothing or automated dialogue. Thus, a major challenge in creating cross-cultural training and uncovering unrecognized cultural biases is getting the affective component correct in any type of computer-based environment. In environments that are "non-human", such as game-based environments or even immersive simulated environments, finding a way to represent cultural aspects and to use those attributes to discover unintended side effects related to bias are contemplated herein.

An embodiment of the current system, generally referred to as AMITIES (Avatar-Mediated Interactive Training and Individualized Experience System), provides an infrastructure for digital puppetry, supporting multiple forms of user interfaces, ranging from motion capture (literal control) to marionette-style manipulation (figurative or gestural control). The system provides means for human-to-human communication that include non-verbal, as well as verbal, communication. The system's support for nonverbal cues that are triggered by but are not mimics of the puppeteer's gestures is essential to the messages being conveyed. This system allows simulated environment to be used to prepare people for cultures with which they are not familiar, as well as allows for the testing of hypotheses about the effects of these perceived and actual cultural differences on participant behaviors. See FIGS. 7-10 for detailed descriptions of various aspects of AMITIES, including its support for multiple interactors and multiple observers.

The system user interaction paradigm (gestural control) places low cognitive and physical loads on the puppeteer. It employs a communication protocol that results in low network bandwidth requirements, supporting the transmission of complex behaviors between geographically remote sites. The system incorporates a process for the iterative design and development of the appearance and behaviors of virtual characters. This process involves artists, puppeteers/interactors, programmers and, most importantly, the requirements of users of the resulting system. Components of this include model design and creation, and verbal and non-verbal behavior selection and implementation (e.g., puppeteered motion and automated motion). The system also provides support for session recordings that can be used in after-action review and to seed new automated behaviors.

All data associated with the participant, interactor and avatars (movements, gestures, audio expressions) are stored in an activity storage and retrieval module. These data can be used to recreate all aspects of the participant experience for purposes of evaluation, coaching or reflection. Aggregate data can also be stored for analysis. Typical uses of these data include, but are not limited to, data analytics that can inform coaching strategies and artificial intelligence behaviors of out-of-focus avatars. Typical data captured include duration of speech, initiated conversation, reciprocal response, head orientation and position, user position with respect to each avatar, facial expressions, eye gaze, body poses (e.g., slouching), and participant talk time versus avatar talk time.

In addition to the embodiments described above, the current invention can support viewing of the avatar behaviors and, where appropriate, viewing of the participant activities by an unlimited or authorized limited number of observers. These observers cannot change the experience directly, but can be involved in real-time or off-line coaching. Authorized observers can also provide tagging of observed events (participant behaviors) that are associated with sequences of activities. These tags can indicate positive or negative events. Each such tag is associated with a portion of the captured data, so that a participant or coach can quickly look at the activities that led to that tag. This provides rapid access to important portions of the captured data that can be used in coaching and reflection. All such tags are retained with the data, including aggregate forms that are archived for analysis.

The system uses the software concept of a "sandbox", which allows for a flexible and ever-changing environment that can shift and change depending upon the attributes wanted and the characteristics of the avatars placed within the sandbox. This approach isolates core elements of the system from experimental components. The core elements are well-tested and provide a stable set of common services. The experimental extensions can implement any type of environment that involves human-to-human interaction, mediated by digital puppetry. This plasticity allows a wide range of applications as evidenced by existing projects involving teacher education (as will become more apparent as this specification continues), cross cultural communication, peer pressure resist/avoid strategies, interviewer training, and communication skills development for young adults with autism.

In an exemplary application of this embodiment, a middle-school classroom can be established, for example with props, whiteboards, and children. This room is not a traditional classroom; it is a virtual setting and the students in the classroom are avatars. The virtual students may act like typically developing or not-typically developing students, depending on the objectives of the experience. Participants can interact with students and review previous work, present new content, provide scaffolding or guided practice in a variety of content areas, and monitor students while they work independently. In an environment like this, prospective teachers can learn the instruction and pedagogical skills needed to become effective teachers, and practicing teachers can hone and refine their skills. Using the current system, teachers can do all of this without putting actual children in harm's way and without facing consequences of failure in a safe, controlled environment. Issues of remediation and open reflective discourse can occur in real time, allowing participants to step away and then immediately return to the classroom after receiving some coaching with the virtual students having no memory of their missteps. Consequently, successful and learned virtual rehearsal experiences for each participant that instills both confidence and builds reflective teaching practices are created.

Figure 1B:
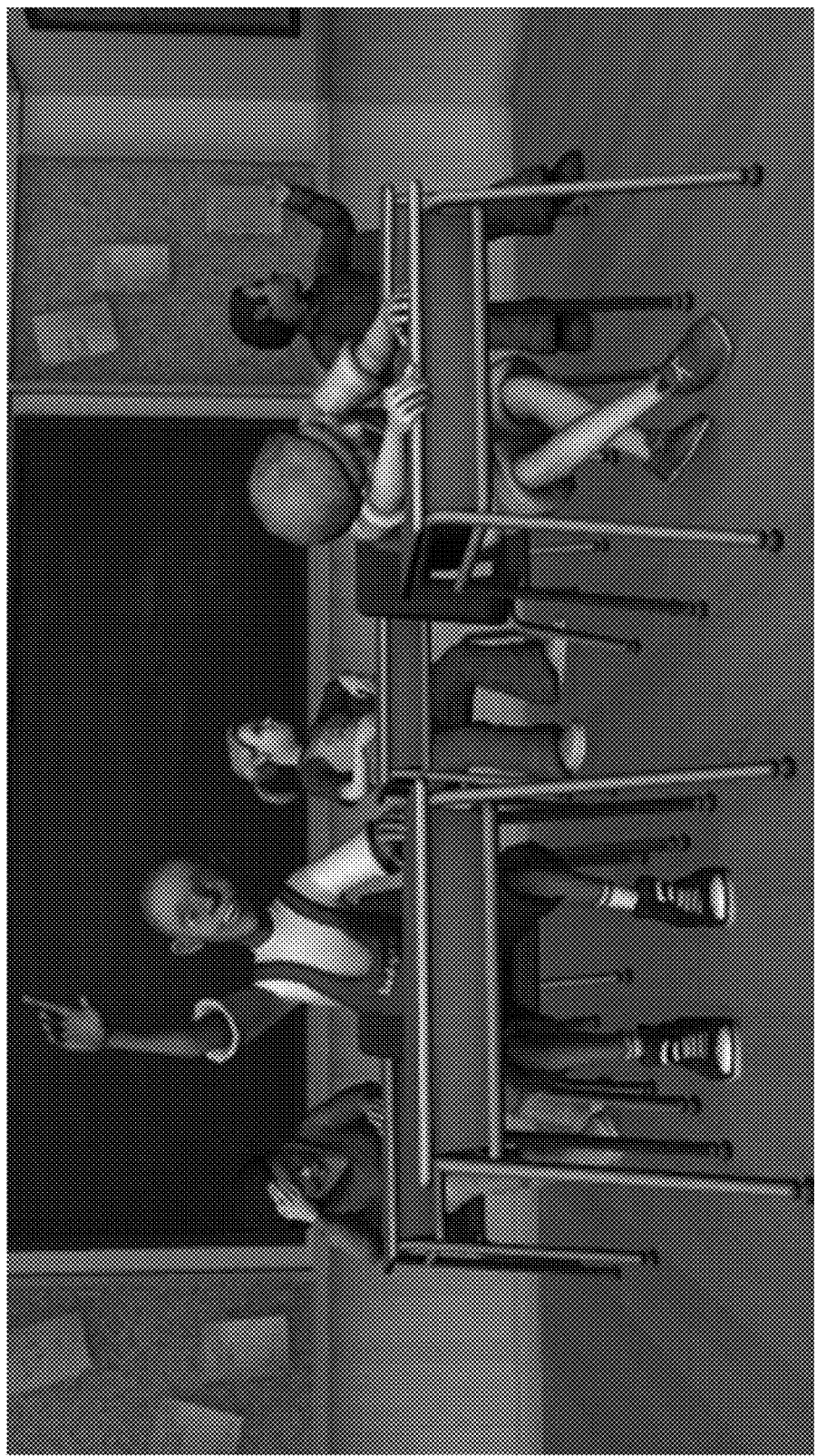
FIG. 1B is a computer simulation of a classroom children, most in a distracted state.

The above scenario details what can be provided by the current system built on top of AMITIES, and a set of pedagogies, content and processes, created as a structure for universities to positively impact teacher preparation. The environment delivers an avatar-based simulation intended to enhance teacher development in targeted content and/or pedagogical skills. Teachers have the opportunity to experiment with new teaching ideas in the system without presenting any danger to the learning of "real" students in a classroom. If a teacher, novice or experienced teacher has a bad session, he or she can reenter the virtual classroom to teach the same students the same concept or skill. In real classrooms, students might get bored and become difficult to manage when an instruction routine is repeated. Moreover, in real classrooms only one or two teachers can practice an instructional routine with a group of students. In the current virtual system, instructional routines may be repeated with an individual teacher or across several teachers using the same instructional context until the routine is mastered. The instruction context may then be changed systematically to examine how participants respond to a changing classroom environment. FIG. 1A shows virtual students on task; FIG. 1B shows them distracted, except for the student in front row left who is presently controlled by the puppeteer.

In an embodiment, the current invention discovers unrecognized biases that negatively affect the performance of teachers and their engagement with students. Viewing teaching as a cross-cultural experience may at first seem a stretch of the imagination, but further introspection makes it clear that teachers, especially of middle school students, have vast cultural differences with their students. The first and most noticeable difference is ethnicity, with over 87% of today's classroom teachers being middle-class white females, while classrooms each year become increasingly more diverse; the second is geographical with the majority of schoolteachers living in rural areas or the suburbs versus the inner city; and the last is generational. Digital puppetry-based simulations that account for this range of differences provide a safe place for self-discovery and rehearsal—safe for the teachers and for the real children with whom they will work upon graduation.

More than one in every three Americans is a minority or an ethnicity/race other than a non-Hispanic single-race white individual. The current number of minorities in the United States now exceeds 102 million. While the Hispanic population continues to climb steadily, the dropout rate among Hispanic youth is alarmingly high. A report from the U.S. Census Bureau (2008) indicated that, of youth between ages sixteen and twenty-four, Hispanics accounted for forty-one percent of all current high school dropouts. Hispanics are listed as having the highest dropout rate of any cultural group and yet represent the largest minority population in the U.S., leading to a belief that the reason Hispanic youth are dropping out of high school is because the system is discriminatorily pitted against them and there is a scarcity of social policies in place. This discrimination is the foundation for the study described herein, as it relates to potential bias against Hispanic males by both placing the label of emotional disturbance upon this population with the resulting lowered academic expectations and outcomes due to this label. It is reported that fifty to sixty percent of students labeled ED drop out of high school. From 2002-2007 the Hispanic population in the United States saw a two-percentage point increase in the number of students labeled ED. The identification of Caucasian students fell by almost three percentage points, while the increase in all other demographic groups was negligible moving anywhere from a hundredth to a tenth of a percentage point.

In an embodiment, the current invention determines the potential for educator bias of preservice teachers (predominantly white and female) on their interactions with virtual secondary male Hispanic students identified with ED compared to those without an identified label of ED. In this true-experimental mixed methods design with a weightless control study, data were collected on two non-equivalent groups of six participants for a total of twelve participants. All participants were undergraduate students pursuing degrees in secondary education with only field or student teaching experience. All participants were enrolled in an exceptional student education college course and were randomly assigned to either a control or experimental group. Each participant took two online implicit association tests via Harvard University's PROJECT IMPLICIT, one on race and the other on disability. In addition, participants took a baseline survey via the "Understanding Prejudice" webpage.

After these initial tasks were completed, participants interacted with virtual students within the current system four (4) times over a period of two (2) weeks. All participants rated how they expected individual students to perform within each simulated classroom experience based solely on a brief description of that student. After each experience, participants completed a brief reflection of their experience that was video-taped—that process is hereafter referred to as an After Action Review (AAR). After the second and fourth visits with the exemplary system, the experimental and control groups respectively viewed and discussed modules on emotional disturbances and cultural competence produced by Vanderbilt University's IRIS Center and housed online on the Department of Education's IDEA Partnerships webpage called the "Learning Port". During the participants' final week of the study, AAR questions were given in a written format to both the control and experimental groups and participants once again completed the baseline survey given in week one. The control group completed the same modules and discussions conducted by the experimental group.

Participant interactions with virtual students within the current system were observed via video recordings. For each session, one alternating student was identified as having an emotional disturbance; however, behaviors for the alternating Hispanic male secondary student remained consistent throughout all experiences. In research question two, each dependent variable was analyzed prepost with the independent variable being time.

Inter-rater reliability on all video recordings for both live interactions and the intervention were set at 80% or higher agreement. The observed videos were viewed and frequency counts for each dependent variable were compiled, then compared with two research assistants. Agreement between coded video for all parties was at 100% on each recording. Raw footage from days and/or sessions where discrepancies occurred (e.g., hard drive crash, audio distortions causing agreement to fall below 80%) was given to the research assistants and a 100% agreement between the primary researcher and the research assistants was established. Video recordings that required additional viewing included both control and experimental participants. Overall fidelity of treatment was established at or above 80% and 100% of the videos that were viewed. Research questions, which looked for cultural statements, were eliminated from analysis, as no such statements were observed. Frequency counts for each listed dependent variable were tallied and entered into SPSS for statistical analysis as detailed below.

A multivariate analysis of variance was used to compare differences between interactions of pre-service teachers and students with and without the ED label and between the other individual characteristics of the identified students on positive comments, negative comments, and proximity.

Hotelling's Trace was not statistically significant for interactions between the ED label and student ($F (1, 11)=2.322$, p=0.144) or ED label (F (1, 11)=0.688, p=0.582). However, there was a statistically significant effect for student (F (1, 11)=4.838, p=0.028).

Although there was no effect for ED label, participants gave more positive comments, negative comments, and used proximity more often with one virtual student than with another virtual student, suggesting that there was a difference between the individual characteristics of the students and participant interactions in the system.

A multivariate analysis of variance was used to compare differences between (a) students with and without the ED label, (b) other individual characteristics of the identified students, and (c) pre- and post-test measures on positive comments, negative comments, and proximity.

Hotelling's Trace was not statistically significant for interactions between the ED label, student, and time (F (1, 11)=1.098, p=0.399); ED label and student (F (1, 11)=1.952, p=0.192); ED label and time (F (1, 11)=0.263, p=−0.850); and student and time (F (1, 11)=1.577, p=0.262). Moreover, there were no significant differences for main effect of ED label (F (1, 11)=1.966, p=0.190) or time (F (1, 11)=0.754, p=0.547). However, there was a statistically significant effect for student (F (1, 11)=4.037, p=0.045).

Although there was no effect for multiple dependent variables, participants gave more negative comments, and used proximity more often with one virtual student than with another virtual student, again suggesting that there was a difference between the individual characteristics of the students and participant interactions in the system. Interactions were significant for negative comments and proximity when looking at student.

Human-to-human communication is complex and includes both verbal and nonverbal communication. The current system allows for a training and virtual rehearsal environment, whereby characters/avatars that exhibit believable, natural behaviors interact with participants to create virtual experiences designed to trigger emotional/empathic responses. This augmented reality environment can be used for multiple purposes including to prepare people for cultures with which they are not familiar, as well as for the testing of theories about the effects of perceived and actual cultural differences on participant behaviors.

Avatar Control for Mediated Dialogues

In an embodiment, the current invention is a control paradigm in a system that supports verbal and non-verbal interaction across long distances for the purposes of training, education and entertainment, with a particular emphasis on interpersonal skills development. A focus of this embodiment is the improvement of the interface from literal puppet control (direct mimicking of the puppeteer's body movements) to a more abstract marionette style control that reduces cognitive and physical loads on the interactor, while simultaneously decreasing network demand and improving the quality of the animated character behaviors.

Additional improvements to the current system built on AMITIES provide: (1) a low-cost, low-demand (physical and cognitive) interface for puppeteers that allows them to easily control verbal and non-verbal activities of a set of virtual characters; (2) a low-cost, unencumbered interface for participants that allows them to employ natural movement and verbal/non-verbal interaction with virtual characters; (3) a network protocol that supports real-time remote interaction even when dealing with relatively poor network connections; and (4) an integrated after-action review system that provides trainers with the ability to tag and comment on events, subsequently using these to assist reflection on the part of participants.

The control paradigm has evolved from a very literal system based on motion-capture to a gestural one based on a marionette paradigm. Common to all the implemented paradigms are support for switching avatars and triggering agent based behaviors for those characters not presently under direct control. In effect, there can be many virtual characters, with the in-focus character or avatar being completely controlled by the interactor, and the out-of-focus characters or avatars exhibiting agent-based behaviors.

Initially, tracking cameras were utilized with the interactor wearing a vest and baseball cap that had retro-reflective markers. The vest had markers on wrists, elbows and shoulders. The baseball cap had an easily recognized pattern of three retro-reflective markers in order to capture orientation as well as position. This approach had noise problems typically experienced in motion-capture, but without the opportunity for post-production, as all actions had to take effect in real time. Moreover, with capture rates of 120 fps, a substantial amount of network data had to be transmitted, leading to the attendant issues when communicating with participants who had poor connectivity.

The system then switched from using motion capture to a series of gestural systems when employing puppetry for experiences that dealt with peer pressure and cross cultural interaction. The first involved replacing upper body tracking with a single retro-reflective ball on a golf tee-like holder (a pawn). In this version, avatar control was done by moving the pawn close to the desk on which we placed a template of characters (one per column) and their genres of behaviors (one per row). Once a selection is made, the interactor raises the pawn and it enters a virtual sphere that is populated by key-frames (also called microposes). As one moves the pawn, the system finds the closest such poses for weighted blending and then starts a process of decaying the weights of current poses, while increasing those of the newly "selected" ones. Facial gestures, mouth movements, agent behaviors and scene transitions are controlled by a game pad. Network traffic is greatly reduced with this paradigm in that all that needs to be transmitted are the newly selected microposes and their weights. The actual pose blending takes place independently at the server and client sites.

When MICROSOFT KINECT was released, a literal mode of controlling avatars was tested again and is a contemplated option. The problem with literal control of avatars is that it is difficult to implement some desired behaviors, such as having the avatar place her head on a desk, as is often desired when using the system in teacher training. Having the interactor place her head on the table would make it very hard for her to keep track of what is happening at the other end, as the window displaying the participant is difficult to see from that position. Other actions like standing up or clicking a pen are also more natural to trigger by gestural, rather than literal movements. For these reasons, gestural control was again implemented with the capabilities of the RAZER HYDRA. An operator's interaction with a RAZER HYDRA can be seen as an example in FIG. 12.

The RAZER HYDRA uses a magnetic field to detect absolute position and orientation of two handheld controllers. So long as the controllers are in front of the magnetic sensor and not excessively distant, the device operates with a reasonably accurate precision of one millimeter and one degree. Each controller has five digital buttons, one analog stick/button, one bumper button and one analog trigger. The left controller was used for character selection, zooming and mouth movement; the right controller was used for agent behaviors and facial gestures. As with the pawn mechanism, a library of microposes unique to each virtual character was established.

Control of the current avatar's pose is done by gestures that are mapped to microposes, with variations in those gestures coming from being close to several poses and by twisting the controllers to get subtle deviations. The precise mapping of interactor gesture to character pose can be personalized by each interactor based on what he or she feels is cognitively easiest to remember and places minimum physical demands. This particular approach appears to provide the best balance between expressiveness and cognitive and physical requirements on the interactor.

The participant (or trainee in certain cases), typically located at a remote site, stands or sits in a front room in front of a large display on which the current scene is visible. The participant's movements are tracked. Although the participant's body, head and eye orientation are not tracked in all instantiations, these are observable by the interactor through a viewing window, such as provided by SKYPE or GOOGLE HANGOUT. Movement of the participant towards the display results in similar movement of the virtual camera through the scene's space. For instance, in classroom instruction, when the teacher moves towards a student, the virtual camera moves in the same direction. If the participant bends down, their point-of-view can result in eye-to-eye contact with the virtual character. In the classroom environment, the virtual children's eyes can automatically follow the teacher, unless the student is intended to exhibit autistic behavior or attention deficit.

The current system incorporates a process for the iterative design and development of the appearance and behaviors of virtual characters, and the context in which these characters operate. This involves artists, interactors, programmers and, most importantly, the requirements of participants of the resulting system. Components of this include specification of character traits (determined by the customer, e.g., trainers or educators), model design and creation, and verbal and non-verbal behavior selection and implementation (puppeteered motion and automated motion).

Figure 2:
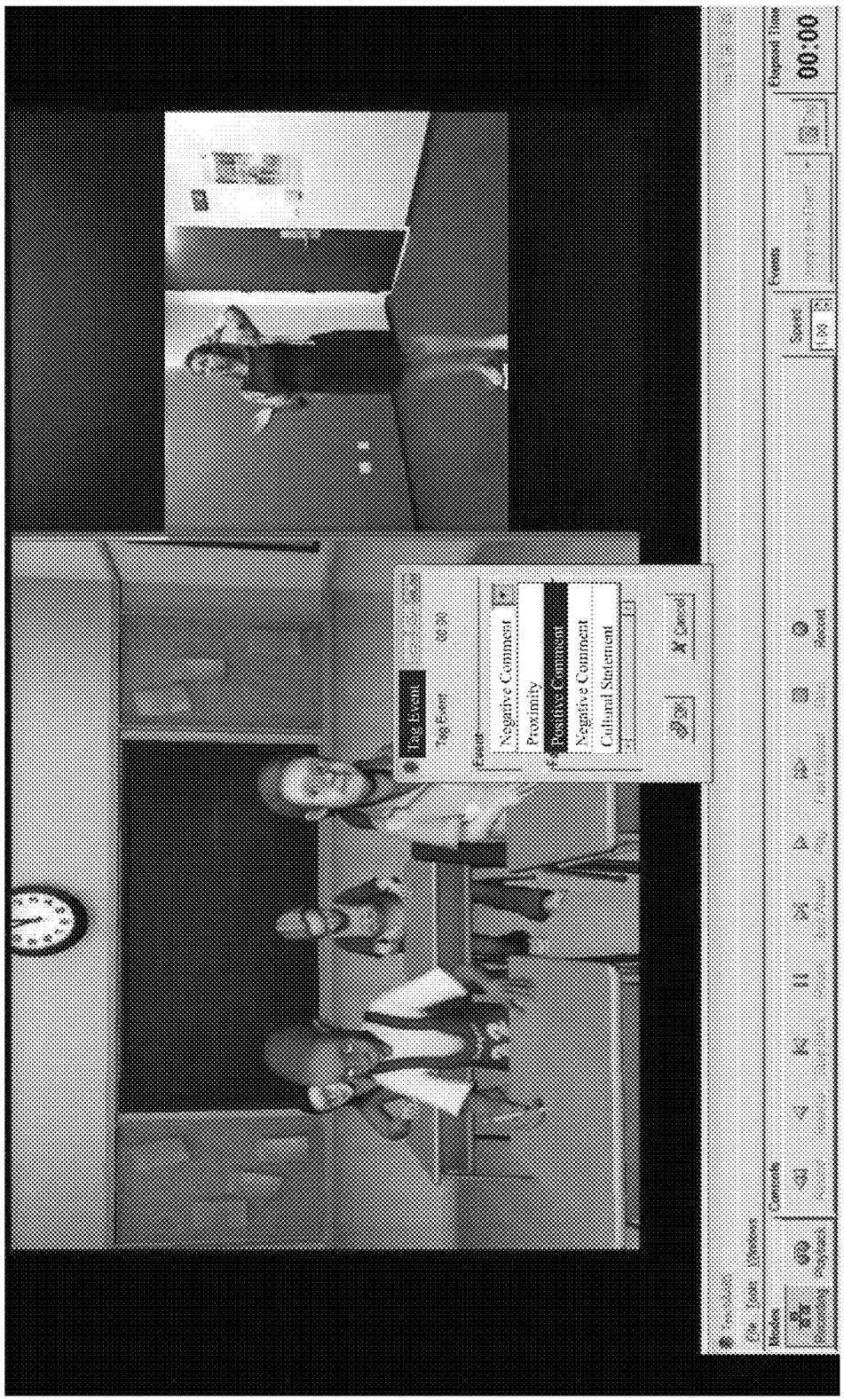
FIG. 2 is a graphics user interface screen shot of an embodiment of the invention.

FIG. 2 shows a participant experiencing the current system in a virtual classroom.

Event tagging, used in after-action review, is also shown. In an embodiment, the design process starts with one or more meetings to determine the requirements and ensure that they are clearly understood. These meetings can include a principal investigator, two to three interactors, a software developer, at least one modeler and a subject matter expert.

The interactors then rehearse the characters' (including the participant's) behaviors (verbal and non-verbal) using a role-playing approach designed to flesh out the characters' backstories and interaction styles. This does not result in a traditional script, but rather a mix of story elements, branching logic (used as roadmaps to important events), and motivations for each character. Latter stages of these role-playing sessions are recorded for analysis and eventually for use by the artist(s) and programmer(s). In another embodiment, the design is preset or predetermined for each of the characters. These initial steps establish artistic/technical requirements. The concept art is then produced. Once these artistic designs are accepted and the role-playing is deemed to have uncovered the collection of required gestures (facial and body), the artists develop the models, e.g., texturing and rigging of the characters. Key frames (microposes) are then identified, where the key frames support specific behaviors (those uncovered in rehearsal) as well as a broad range of dynamically created behaviors so the puppeteer can react to widely varying interactions with participant. Additionally, the artist/interactor/programmer team develops animations of specific behaviors, for example "annoy others", "look attentive", or "act bored", and transitions between scenes, as needed. This results in an operational set of puppets and scenes. With this nearly final product in-hand, the interactors can perform role-playing rehearsals again, but this time using the puppetry system. The outcome of this process is then a set of characters, microposes, scenes, animations and decision trees that enable the final experiences.

Though appearing linear, this process is cyclic. For example, the interactors may seek animations that go beyond budgeted time for the artist. When this happens, the team can discuss the tradeoffs. Occasionally, story, artistic or programming techniques can be identified for overcoming limitations, and priorities can be adjusted, as part of the creative process.

The current system is not designed around a single set of experiences but rather around a flexible methodology of controlling expressive, avatar-mediated, human-to-human communication. The system's plasticity allows a wide range of applications as evidenced by projects involving teacher education, cross cultural communication, peer pressure resist/avoid strategies, and communication skills development for young adults with autism.

The system further can include a subsystem for recording live sessions. This subsystem supports coding of events during and after these sessions. Event types can be selected and used to hone in on sets of frames in which these behaviors were observed during a training session. Such a capability facilitates after-action review, reflection, and documentation of participant progress. This same feature can also be used to seed new automated behaviors.

In another application, the current system has been used to prepare teens with autism for their first job or college interviews. It has also been used to help teachers identify recondite biases, so they can develop practices that mitigate the influence of these biases in their teaching practice. The ability of the current system to track movement and time spent with individual students is an effective component of this program, as it provides objective measures for the teacher and trainer to use during reflection.

Physical-Virtual Avatar

In an embodiment, the current invention controls physical-virtual avatars that occupy a specific region in 3D space, where the avatars are suitable for interacting with elements in the environment. To facilitate this control, a paradigm of microposes was developed that overcomes the need for high network bandwidth during remote teleoperation of avatars. The avatar itself uses a control strategy that interprets the received microposes data and executes motions that appear natural and human-like in the presence of data loss and noise. The physical-virtual avatar was utilized in a range of training and learning scenarios. Results during testing revealed a reduced bandwidth requirement during remote teleoperation of physical virtual avatars and a good motion tracking performance with respect to a commanded pose from the inhabiter.

A virtual avatar is described as a perceptible digital representation whose behaviors reflect those executed, typically in real time, by a specific human being. As an extension to this definition, a physical-virtual avatar is described herein as an entity that facilitates remote presence with an intention to interact with elements in the environment. Robotic entities can be used to exhibit a physical presence in such remote environments and provide the infrastructure needed to accomplish human-like tasks, such as gesturing during conversations or more complex actions such as picking up and moving objects. In this context, persons who "drive" their remote robotic counterpart are referred to as inhabiters. In order to achieve this, data that conveys the necessary action to be performed by the robotic entity at the remote site must be transmitted over a network. Limitations in bandwidth and network latency are challenges that must be overcome in order to facilitate this transmission efficiently. Additionally, the robotic avatar must be capable of interpreting this received data and executing a planned motion that captures the intent of an inhabiter. An objective is that the generated movements should appear human-like, even if the input data includes artifacts and noise. In contrast to telerobotics, the control paradigm for human-avatar control in this work is less tightly coupled, with the avatar having the flexibility to exhibit independent autonomous behaviors in situations where there may be noisy data or packet loss.

Figure 3:
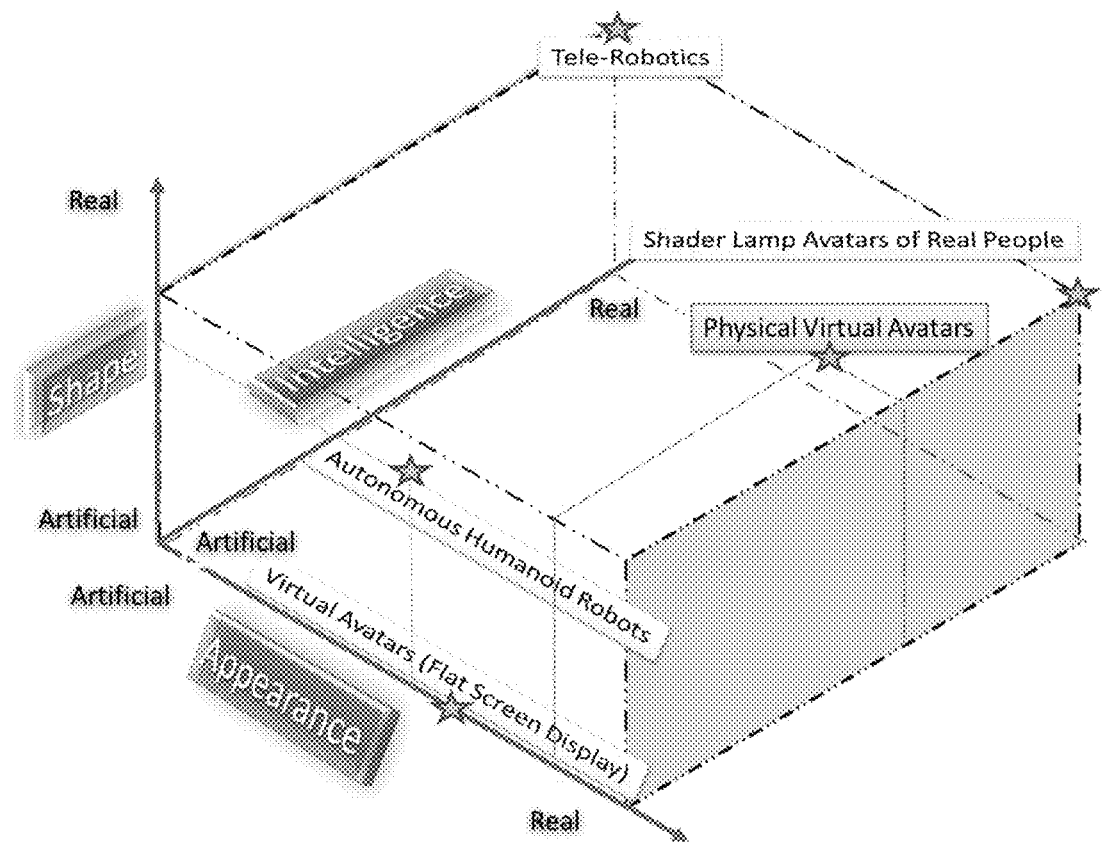
FIG. 3 is a conceptual spatial diagram.

While there exist many examples of specific manifestations of "virtual humans", there is a current need to define a comprehensive space of characteristics, along with exploring such a space to develop some understanding for which characteristics matter for certain conditions and tasks. For example, the characteristics of virtual humans might be described by a 3D space comprising the artificial-real dimensions of virtual human appearance, intelligence, and shape as depicted in FIG. 3.

Virtual avatars on a flat screen display, for example, could be made to appear like a particular human and exhibit artificial intelligence, but have no real shape (i.e., physical manifestation) associated with them. A typical example could be a football player in a computer game. The intelligence of this avatar can tend towards the real when controlled by a real human playing the game. Similarly, the appearance can tend towards artificial if a human-player customizes the avatar to look like someone else. Autonomous humanoid robots can be made to look similar to humans both in appearance and shape (depending on their degrees of freedom), but exhibit artificial intelligence. Telerobotics, on the other hand, occupies one specific corner of the 3D space, since it is generally associated with human control, i.e., real intelligence. In another corner are animatronic Shader Lamps avatars of real people, essentially being telerobotics combined with real appearance.

If one could combine physical presence and dynamic virtual appearance, one could transmit important non-verbal information typically conveyed in human-to-human interactions. This is the concept of physical virtual avatars seen in the 3D space shown in FIG. 3. Examples include conversations between teachers and students, or physicians and patients. A combination of eye contact, body proximity, forward leaning, smiling, and touch can convey intimacy and trust; while averted gaze, distance, and the absence of smiling and touch can indicate detachment.

Robotic avatars (e.g., FIG. 12) enable physical telepresence in remote locations, facilitating interactions with the remote environment and helping the inhabiter to accomplish situation-specific tasks. The functionality and effectiveness of these avatars are greatly influenced by the available network bandwidth, since data needs to be transmitted and received from a remote location for full functionality. Additionally, the robotic entity must exhibit human-like dexterity and compliance in its movements to appear natural during interaction despite the presence of noise and packet loss. Objectives of the current invention described herein are (a) to minimize the amount of traffic (data) transmitted over the network, while maximizing the human-likeness of the avatar, and (b) to design the avatar's actuation to match the kinematic and dynamic limits of human motion. In order to achieve these objectives, the following developments took place:

the development of a concept called microposes that reduces network traffic while containing sufficient information to capture the intent of an inhabiter at the remote location; and the development of control strategies that interpret the received data to create realistic and smooth movements of the robotic avatar in the remote location.

Figure 4:
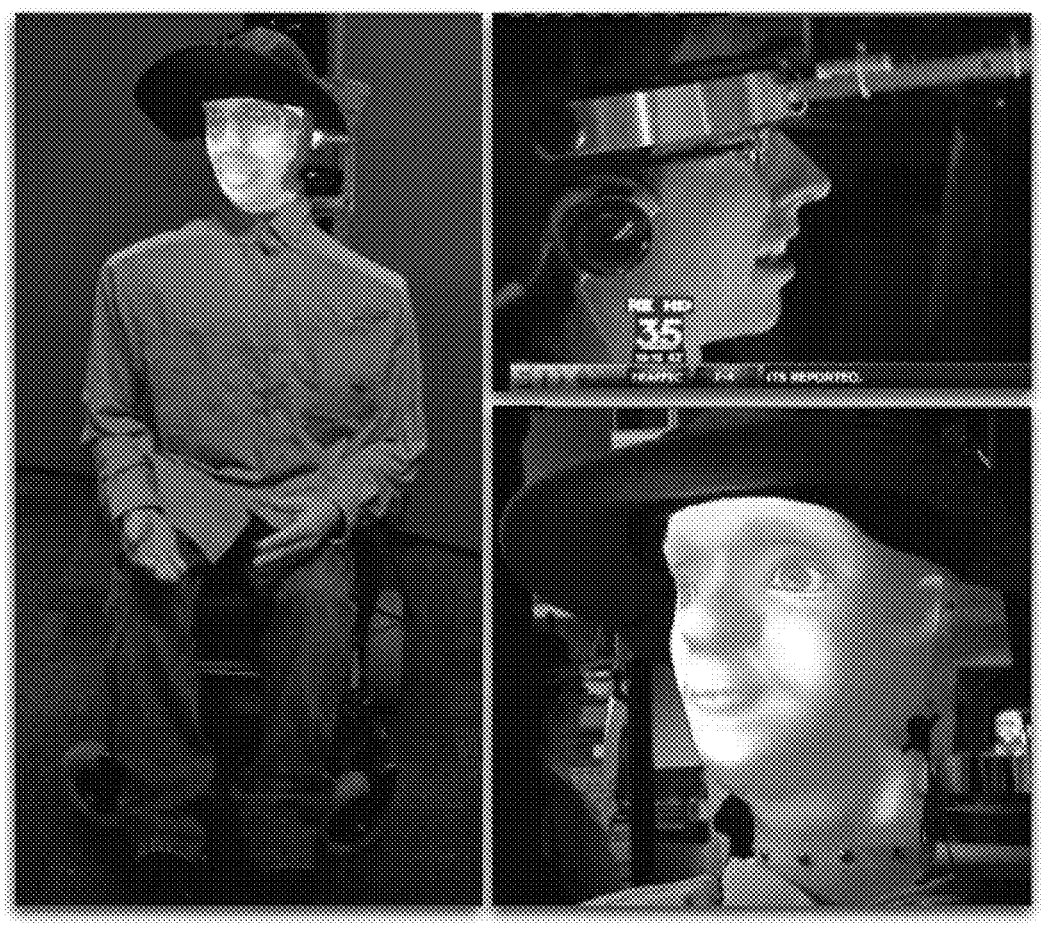
FIG. 4 shows a synthetic character manifested physically being driven by a human inhabiter. Also seen is the inhabiter station which allows a human who is driving the avatar to view and interact with his environment in real-time.

An exemplary implementation of these contributions in a physical-virtual avatar (PVA) system is presented in FIG. 4. The left side of FIG. 4 shows a PVA prototype, with a real human agent and appearance. The top-right portion of FIG. 4 shows real human appearance obtained from a head-worn camera. The bottom-right portion of FIG. 4 shows a real human agent but synthetic appearance from the teacher-training system.

The current embodiment focuses on the space in which a physical-virtual avatar can be pervasive along the dimensions of intelligence and appearance. Each of these dimensions is associated with a continuum, rather than a set of discrete states. Shape, although important, is not a focus of the current specification since the invention is applicable anywhere along the shape axis, provided the challenges associated with projection and rendering on varied surfaces are addressed.

Intelligence, as depicted in FIG. 3, ranges from artificial intelligence (agent-based) to real intelligence (human-controlled). An agent-based avatar is computer-driven, exhibiting a certain degree of intelligence that adheres to a rule-based system. A real avatar, on the other hand, can be controlled either partially or fully by a human in the loop. As previously described, a single avatar can transition from agent-based to real, and vice versa. Appearance of avatars ranges from purely artificial (virtual character) to purely real (real-time video capture of inhabiter), and is dependent on how accurately a human inhabiter's appearance is portrayed on the avatar.

Given the space in which physical-virtual avatars exist, presented herein are two specific examples that are differentiated primarily by appearance and shape. Both examples exhibit a level of intelligence that lies between the real and the virtual, but may vary to a certain degree. The first example is referred to herein as a synthetic avatar and has artificial appearance and can exist anywhere in the continuum of the space axis, i.e., ranging from flat screen displays (2D), to artificial 3D (stereo), to a robotic avatar (physical 3D). The second example is referred to herein as a real avatar, whose appearance and shape closely matches the inhabiter, while intelligence lies between the artificial and the real.

A synthetic avatar is of particular interest when the anonymity of the inhabiter needs to be maintained. For example, a synthetic avatar could be utilized in scenarios where a participant is expected to interact with a specific cultural/professional representation of the avatar in order to eliminate any bias that may be triggered as a result of appearance. The avatar may also be used by a person who has a medical condition or does not want to be identified for some reason, but still wishes to interact with people in a social setting. The appearance of the avatar can be altered synthetically by creating characters as required by a scenario. In the absence of human control, the characters are "intelligent" to a certain degree, executing planned motions and responding to stimuli in the presence of a sensing system.

FIGS. 5A-5D shows one such synthetic avatar (manifesting both in two-dimension (FIG. 5C), as well as in a robotic avatar (FIGS. 5A and 5B)) being used in a classroom teaching scenario. The avatar is a representation of a middle school student and can be controlled by an interactor to help teachers hone their skills in the classroom. In the absence of a human controlling it, the avatar exhibits simple behaviors such as tracking the movements of the teacher in the classroom (and orienting its gaze towards them), showing a lack of interest, and engaging in conversation with other similar avatars. When an inhabiter takes control of the avatar, its movements and actions are driven by a low-network traffic paradigm called microposes using commodity game controllers, such as MICROSOFT KINECT and RAZOR HYDRA, as previously described, or other suitable controller apparatus.

The use of a real avatar is better suited to situations that demand an actual physical presence of a specific person. In meetings, conferences, and social gatherings, for instance, an identity for an avatar can be established through closely matching its appearance and actions to the person who is controlling it. It is expected that these avatars are at least initially capable of accomplishing simple tasks such as gestures, hand-shakes and movement within the remote environment. Eventually, more complicated tasks, such as being able to pick up objects, move objects, and open doors could be performed by the avatar. This is what makes their shape important. To achieve the desired functionality, the actions of an inhabiter must be captured appropriately and transmitted to the avatar, where a control system processes this data to recreate smooth and natural looking motion in the presence of transmission delays and data loss. As an example, one such system is described herein for the head motion of an avatar, but the system can be extended to full-body motion to support a greater range of gestures.

Controlling an avatar remotely (whether synthetic or real) requires efficient transmission of data from the inhabiter station to the physical avatar system while adhering to the available network bandwidth. Traditional methods of avatar control involve some form of motion capture (e.g., infrared cameras and motion capture suits) at the inhabiter's end, and sending the joint-space coordinates to the remote site. The system driving the avatar attempts to achieve these joint-space coordinates in the local reference frame of the avatar, thereby mimicking the actions of the inhabiter. One of the major bottlenecks in such a system is the amount of data transmitted over the network. This problem grows with an increase in the number of degrees of freedom required to ensure smooth and realistic natural motion of the avatar.

A second challenge with such conventional systems is the ability to cope with loss of data during capture. Data for a particular joint may be lost due to occlusion at an inhabiter's end. This discontinuity in data can result in rather quick and jerky motions at the avatar's end. While interpolation between discontinuities can be performed locally by the avatar, there is the risk of aliasing and also executing motions that were not necessarily performed or intended by an inhabiter.

From a technical vantage point, there is the need to reliably and efficiently capture and transmit behaviors and actions of an inhabiter over a long-distance network. There is also a necessity to achieve this transmission even in the presence of limited resources like bandwidth and computational power. There is also a requirement to articulate these actions at the client site, providing smooth interactive performance. The current system employs a communication protocol that results in low network bandwidth requirements, supporting the transmission of complex actions and behaviors between geographically remote sites. This benefit is achieved by employing a gesture-based paradigm that depends on blending of "microposes" to remotely control an avatar.

The gesture-based paradigm supports culturally appropriate gestures and significantly reduces the streaming transmission bandwidth requirements over long-distance networks. The reduced amount of information transferred from the inhabiter's site now requires an increased amount of intelligence at the avatar's site in order to interpret this information and effectively enable interaction. Referring back to FIG. 3, it follows that this paradigm forces the physical-virtual avatar to occupy a specific coordinate along the intelligence axis (whether synthetic or real), while being variable along the shape and appearance axes.

The avatar control system that is presented herein evolved from a very literal system based on motion capture to a gestural one based on a marionette paradigm. For the initial motion capture-based system, the inhabiter wore a vest and a baseball cap. The vest had retro-reflective markers on wrists, elbows and shoulders. The baseball cap had an easily recognized pattern of three retro-reflective markers in order to capture orientation as well as position of the head. This required nine (9) 3D coordinates to be transmitted over the network. The downside with this approach was noise and undesirable data bursts. Noise is common in motion capture systems, and is most often managed by post-production (off-line, after the fact) clean-up of bad or damaged data. Since post-production is not an option in the real-time control of an avatar, the system was prone to significant noise. Additionally, sending this amount of motion capture data resulted in 40 kbps of network traffic [i.e., (nine (9) articulation points×four (4) floats+five (5) floats for pose weights) at a rate of 30 frames per second].

Figure 6C:
FIG. 6C shows a virtual avatar in a micropose.
Figure 6B:
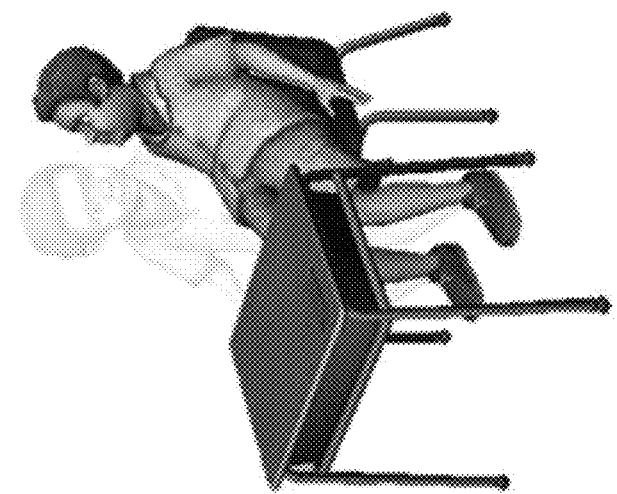
FIG. 6B shows a virtual avatar in a micropose.
Figure 6A:
FIG. 6A shows a virtual avatar in a micropose.
Figure 7:
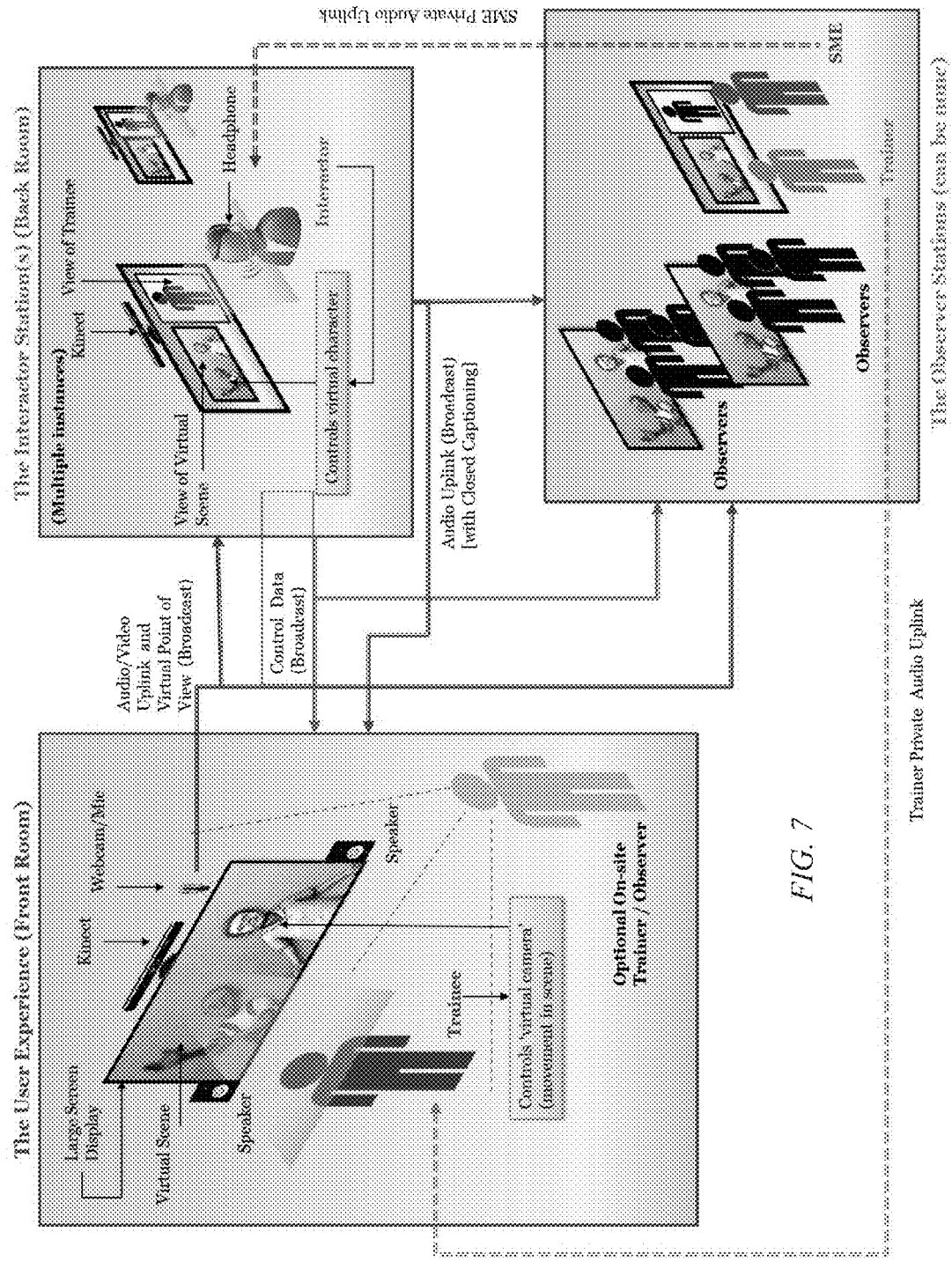
FIG. 7 shows a diagrammatic network of AMITIES, an embodiment of the invention for training using avatars partially controlled by a human interactor. This figure shows communication flow between the interactors, observers and participant.
Figure 8:
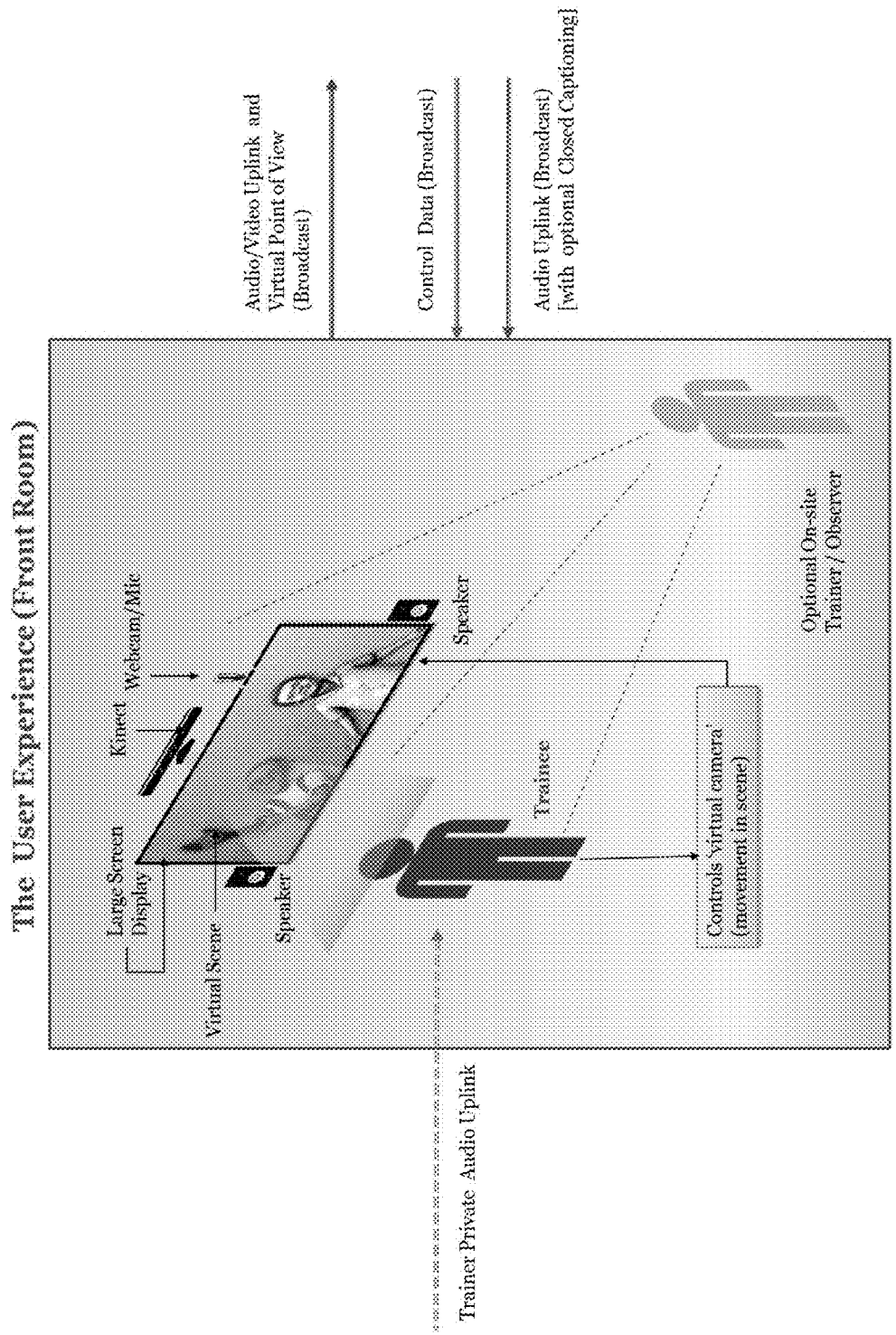
FIG. 8 shows a portion of the AMITIES diagrammatic network focusing on the user station depicting the affordances and communication flow from the perspective of the participant (trainee).
Figure 9:
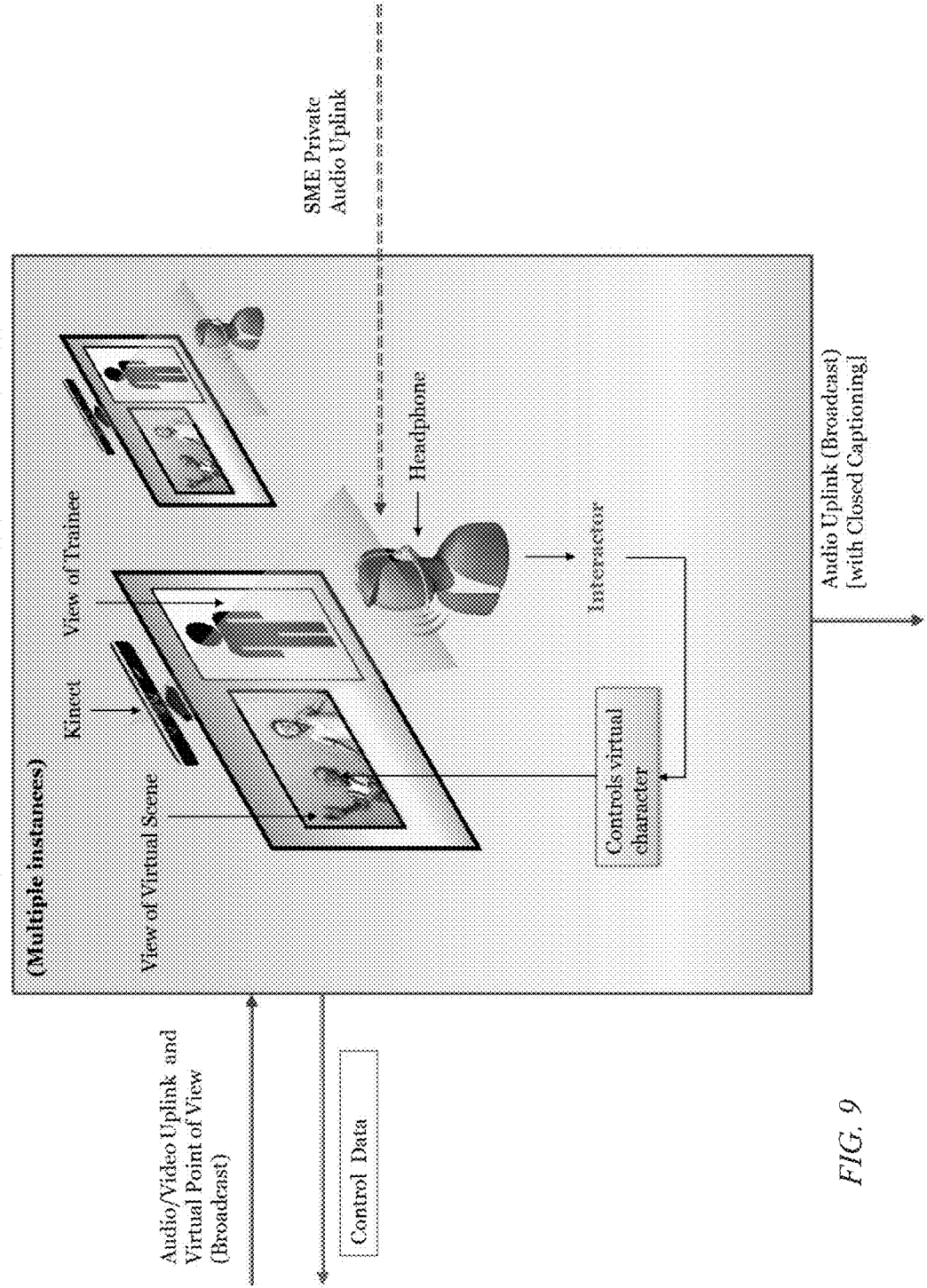
FIG. 9 shows a portion of the AMITIES diagrammatic network focusing on the interactor station(s) depicting the affordances and communication flow from the perspective of an interactor (inhabiter).
Figure 10:
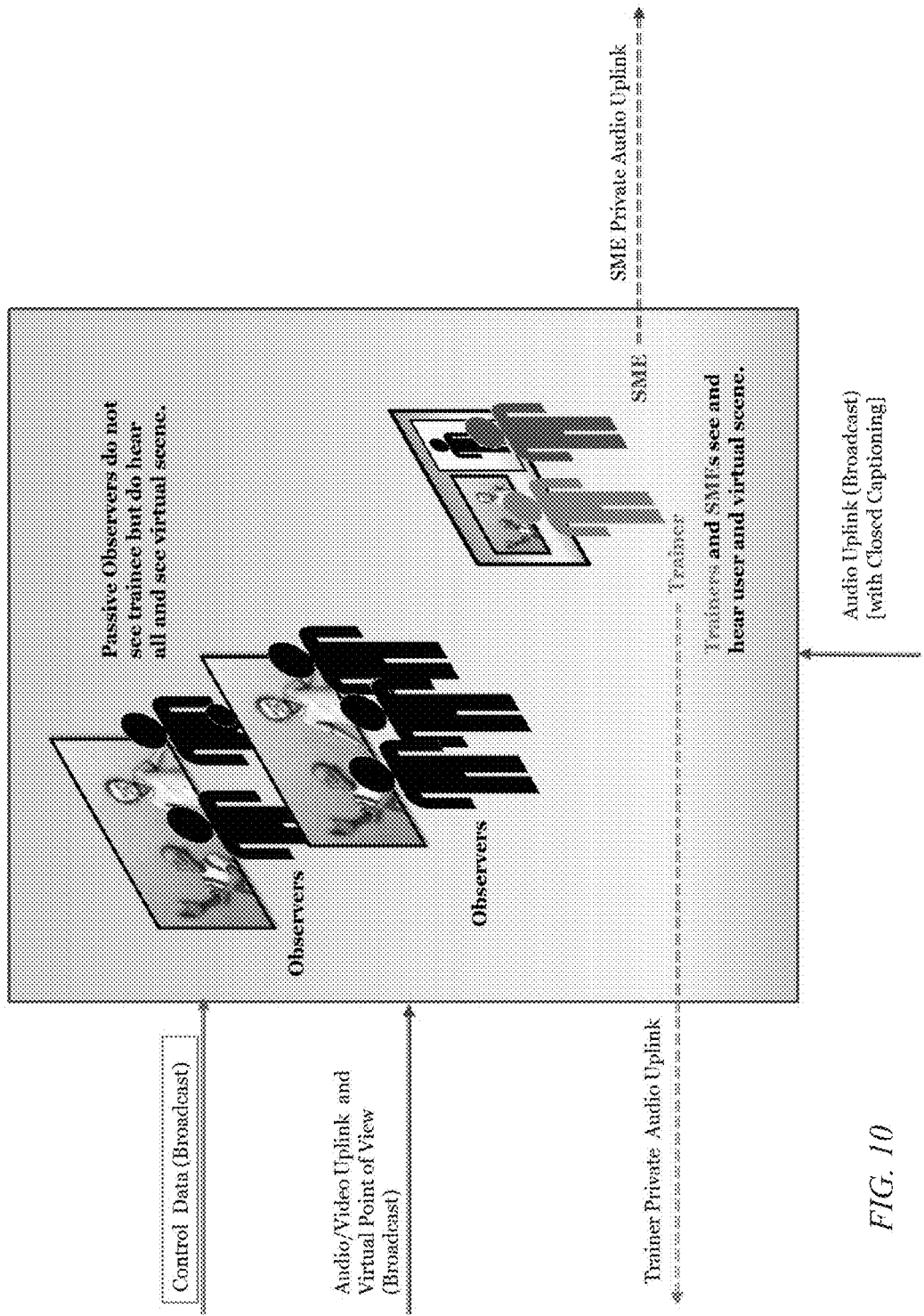
FIG. 10 shows a portion of the AMITIES diagrammatic network focusing on the observer stations(s) depicting the affordances and communication flow from the perspective of an observer or trainer.

To address the problems introduced above, a number of variants of the paradigm were developed, investigating each one in the context of its effect on noise, network traffic, the quality of the experience at the receiver end, and the cognitive and physical demands reported by inhabiters. Regarding the microposes, these are a set of key poses that, in effect, form a basis set for the poses or microposes that an avatar is expected to perform, between which blending can occur. Some of these microposes are shown, in FIGS. 6A-6C, super-imposed on each other to view the "motion-space" of the avatar. In FIG. 6A, the virtual avatar is shown in the microposes of standing (translucent) and holding a pen (solid). In FIG. 6B, the virtual avatar is shown in the microposes of leaning forward and turning (translucent) and slouching (solid). In FIG. 6C, the virtual avatar is shown in the microposes of lying down on the desk (translucent) and raising his hand (solid).

In one variant, to trigger the microposes without using motion capture, the inhabiter was presented with a pose indicator that looked like a pawn with a retro-reflective ball on its top, though any suitable pose selecting apparatuses are contemplated. As the inhabiter moved the selector in 3D space, an infrared camera-based set-up captured the selector's position. Avatar control was then done by moving the pawn close to the desk on which a template of the avatar and its associated behavior was placed. Once a selection was made by tapping on the template, the inhabiter raised the pawn which entered a virtual sphere that was populated with microposes. As one moved the pawn in this sphere, the system found the closest set of poses for weighted blending and then started a process of decaying the weights of microposes associated with the current poses, while increasing those of the newly selected ones.

The software at the avatar's end then used the most recent pose and the new weighted pose to do a natural blend, with old pose weights damping out and new pose weights rising. Additionally, the inhabiter's head was tracked to allow more precise control of the avatar's head. The result was a low noise system that sent very small amounts of data for motions (typically just 10 bytes for the indices and weights of the current pose). Other data that was transmitted included the head orientation (15 bytes*30 fps=3.6 kbps). This control paradigm was successfully used in cross cultural training and protective strategies focused scenarios.

The pose blending system described focused on using a pose indicator device as controller. For inhabiters who want more natural controls, MICROSOFT KINECT (or other suitable similar apparatus) can be integrated as the "pose indicator" to capture upper body movement, while still using the infrared tracking cameras for head orientation. Upper body positions were measured relative to the microposes and used to select the two closest for blending, as was done with the pawn. The resulting variant used the same data packets as discussed above.

While the above two approaches reduce network demands and essentially eliminate noise, each can have drawbacks for particular uses or particular inhabiters. In particular, the inhabiters were somewhat uncomfortable with the non-intuitive nature of the pawn, since this required remembering where the poses resided in an imaginary sphere. MICROSOFT KINECT circumvented this issue, but its full upper body control paradigm left little opportunity to trigger poses such as lying down on a desk, without the inhabiter having to physically perform this action. These limitations can be overcome with a pose selector device in the form of a magnetically tracked controller, such as the RAZER HYDRA or other suitable controller.

The RAZER HYDRA uses a magnetic field to detect absolute position and orientation of two handheld controllers. As long as the controllers are in front of the magnetic sensor and within a six-foot radius, the device operates with a reasonably accurate precision of one millimeter and one degree. Each controller has five digital buttons, one analog stick/button, one bumper button, and one analog trigger. The buttons of the particular pose indicator can be programmed to trigger situation-specific reactions and appearance-related features of an avatar, such as smiles, winks, and frowns. The right controller can be used for other avatar behaviors that are classified into gestures for the purposes of intuitive control.

As with the pawn pose indicator and the KINECT-based pose indicator, a library of microposes unique to each virtual avatar is employed. Control of the avatar's pose is performed by gestures that are mapped to microposes, with variations in those gestures coming from being close to several poses and by twisting the controllers to get subtle deviations, e.g., hand shaking or pen clicking.

FIG. 5A shows a synthetic character manifested physically being driven by a human inhabiter. Also seen is the inhabiter station which allows a human who is driving the avatar to view and interact with the environment in real time. FIG. 5B shows the physical manifestation (robotic) of the synthetic avatar on a mobile platform (wheelchair) to allow motion within the environment. FIG. 5C shows a small class of virtual middle school children. FIG. 5D shows a teacher addressing this class. The virtual avatar in FIG. 5D has his arm raised in a pose very similar but not precisely the same as his corresponding micropose in FIG. 6C, thus showing the detail that can be achieved in the avatar's actions.

An instance of using the microposes to control a synthetic virtual avatar in a classroom teaching scenarios was extended to a real (robotic) avatar that could be used as a physical-virtual entity in the same classroom teaching scenario. In order to achieve this system, the microposes received by the real avatar must be interpreted to create physically-believable motion at the avatar's end of the system. The real (robotic) avatar (FIGS. 5A and 5B) is driven by a set of rotary actuator modules, with integrated sensors in each of the modules providing the positional and torque measurements required to achieve a tightly-coupled, closed-loop control paradigm. The human-like kinematic configuration of the robotic avatar results in a non-linear coupling between the joint space variables that are decoupled using the well-known Recursive Newton Euler (RNE) inverse dynamics. The effect is more pronounced with higher inertial loading of the structural components that make up the avatar and also during execution of higher velocity motion profiles.

Microposes specify a new target position for each joint in the kinematic chain of the robot. Achieving this target position requires a blending between the current/previous pose and the new pose, which, in turn, requires planning and executing a trajectory between two new joint-space coordinates so that it appears natural.

An inverse kinematic solution first determines the joint-space coordinates at every instant in time to achieve the motion required by the avatar to represent the inhabiter. Computed torque control is then used for open-loop trajectory control of the end effector, but is highly dependent on the inertial model of the arm. Therefore, it is coupled with a proportional integral derivative (PID) controller to perform trajectory tracking and ensure disturbance rejection during the movement.

In terms of the actual implementation, the robot can be thought of as an inertial mechanism driven by actuators with controllable torques so that the dynamic equation now becomes:

$$\tau = I(\theta)(\ddot{\theta}) + c(\dot{\theta},\theta)\dot{\theta} + g(\theta) \qquad \text{Eq. 1}$$

where $\tau$ is the vector of joint torques, $\theta$ is the n-dimensional jointspace position vector, $I(\theta)$ is an n×n symmetric inertia matrix, $c(\dot{\theta}, \theta)$ is the n×n tensor or velocity coupling matrix, where n is the number of joints, and g is the n×1 gravity-dependent vector.

For a physical robotic avatar, it is important to keep the motion natural looking during the interaction. With virtual characters, a reset of joint space variables can occur at any time, in which case a transition from the current state space to the initial state space occurs in a single frame. This is barely noticeable due to the small duration over which the transition occurs. However, with a physical robot, such a transition is largely evident since a motion profile has to be executed to achieve the new state space.

A large change between the current and the new state space can result in rapid motion (high velocities), causing the effect to propagate along the kinematic chain due to the non-linear coupling described previously. The parameters of the controller must be tuned to be able to cope with such artifacts that can occur as a result of latency/loss in data packets over the network.

The microposes themselves cannot completely guarantee these joint motion limits. As a result, this is handled at the remote robotic client end using constraints that conform to a normal "accepted" range of human hand motion.

Exemplary actuation of the robotic avatar's head that demonstrates this smooth control paradigm is now described. The robotic avatar can be equipped with a SCHUNK PW 70 pan-tilt unit (or other suitable pan-tilt unit) that carries a rear-projected vacuform head as well as a projector assembly. Communication with the pan-tilt unit occurs via the message-oriented CAN bus. The goal of the control scheme is to enable the avatar to directly mimic the head motion of the inhabiter during interaction while faithfully ensuring smooth, human-like motions. An OPTITRACK IR System is used to capture the inhabiter's head motions and transmitted to the pan-tilt unit, which, in turn, responds by minimizing the error between its current orientation and the received orientation in minimum time. The IR head tracking data is prone to noise resulting in fairly jerky movement at the avatar's end due to discontinuities in velocities. In addition, orientation targets are sometimes overshot, because the unit is not able to decelerate quickly enough. The only adjustable parameters in this mode are the maximum movement velocity and acceleration. Furthermore, the pan-tilt unit uses an internal brake to hold the mode at the maximum movement velocity and acceleration. The pan-tilt unit also uses an internal brake to hold the head in a stable position after the full execution of a move, sometimes leading to delays in the startup of new motions.

To achieve smoother and more responsive behavior, control of the pan-tilt unit can implemented by a regulation of the amount of current drawn, and hence is representative of torque control. In this mode, the pan-tilt unit receives target orientations at 100 Hz, but the achievement of these targets is validated through an external control system. The time-critical execution of the position control loop is handled in a separate thread, thereby providing fine-grained management of the final motion trajectories.

The desired tilt $\theta_{pd}$ and desired pan angles $\theta_{yd}$ are captured based on the inhabiter's head movement and transmitted at a high frequency to the avatar. The difference of these desired angles to the actual positions measured by the pan-tilt unit ($\theta_{pa}$ and $\theta_{ya}$) constitutes the error input e to the PID controller. Based on its proportional ($K_p$), integral ($K_i$), and derivative ($K_d$) parameters, appropriate torques are calculated by the controller and transmitted to the pan-tilt unit. It should be noted that there is an independent current/torque controller for each movement axis.

The control system parameters were tuned by observing the system's characteristics in response to a step position demand. A satisfactory set of parameters provides a compromise between signal rise time, overshoot behavior, and settling time. It was found that each movement axis required a set of different tuning gains, since the apparent inertia of the pan-tilt unit varies due to the tilt-axis being subject to the forces of gravity along its direction of motion. Standard tuning rules, such as Ziegler-Nichols and Pessen-Integral, were used as a basis to settle on appropriate gains that provided the desired response without exhibiting overshoot or oscillations.

A good balance of signal overshoot and convergence speed was found with the parameters ($K_p$,=12, $K_d$=24, $K_i$=0) for the pan axis and ($K_p$=12, $K_d$=$K_i$=0) for the tilt axis.

To compare the performance of the proposed torque controller to the commonly implemented position controller, a data set of random human head motions was recorded. Without any additional processing, the controllers should be able to faithfully replicate the desired angular position profile, while avoiding jerky, discontinuous, and visually distracting velocities.

The position controller implementation plans a trapezoidal velocity profile to move from the actual to the desired position. New position demands will trigger an automatic re-planning based on the current position, velocity, and acceleration. The implementation used for these tests employs a maximum velocity of 200 m/s and a maximum acceleration of 400 m/s$^2$ for both axes.

Both the position controller and the torque controller track the set point angle very well, but the position controller converges noticeably faster on set point changes (about 50 ms for the position controller versus about 100 ms for the torque controller). On the flip side, the position controller slightly overshoots its target angles, most notably at time instants 3.44 s and 16.33 s. This overshoot is not present in the torque controller output.

Apart from the position performance, it is essential that the controller exhibits human-like smoothness in its velocity profile. It should be noted that the angular velocities are derived through differentiation of the input signal (human head movement) and the output signals that the controllers produce. Although both controllers exhibit some level of oscillation in their derived output velocity, the torque controller variations occur at a significantly lower frequency and magnitude. The superior performance of the torque controller is especially apparent when rapid changes in demand velocity lead to uncontrolled oscillations in the position controller response, while the torque controller shows the same magnitude of low-frequency variations that were apparent at lower movement speeds. The high-frequency noise in the velocity signal of the position controller is undesired and may lead to a degraded visual appearance of the executed motion.

EXAMPLE APPLICATIONS

Figure 11:
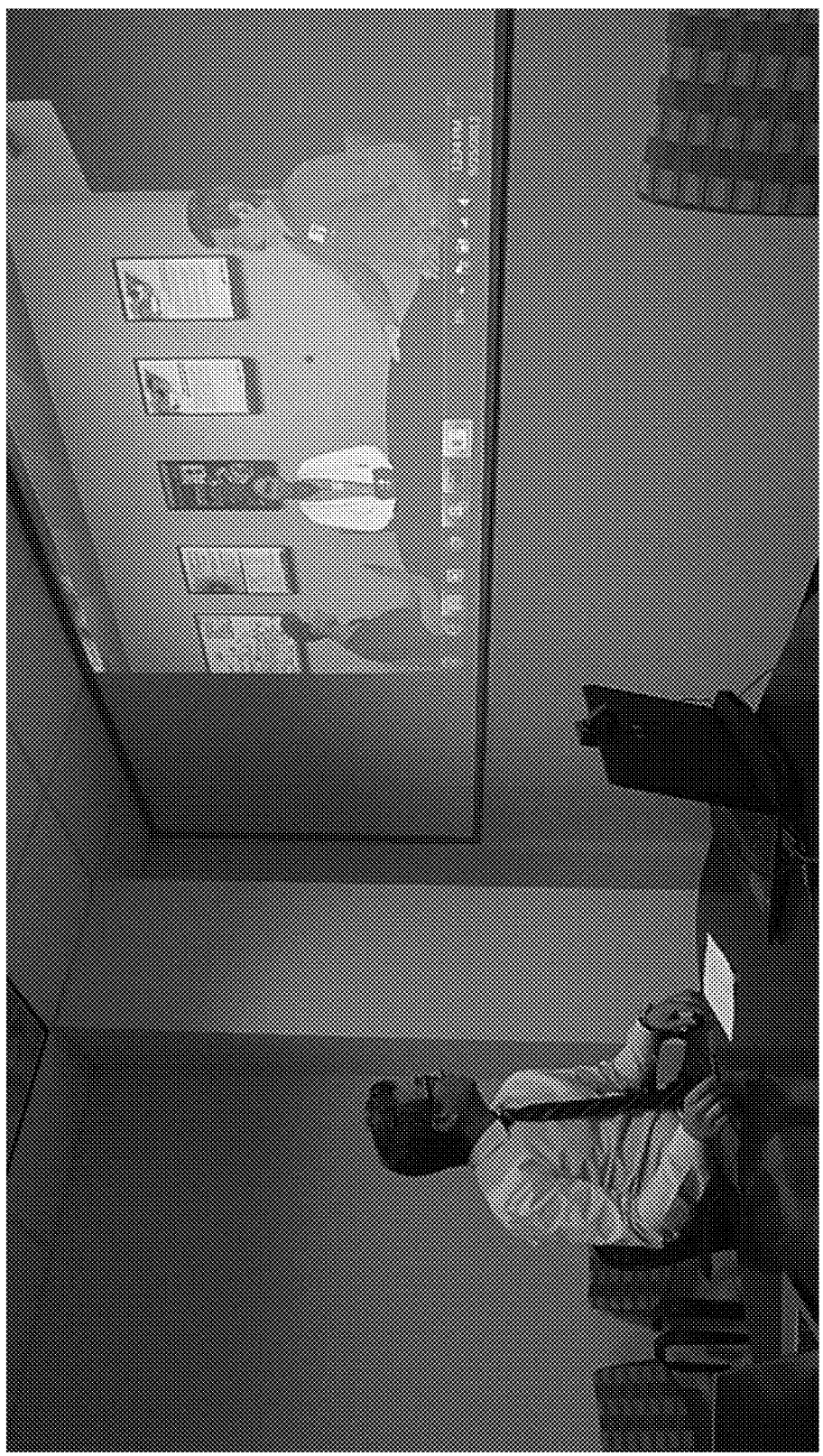
FIG. 11 shows a participant rehearsing debriefing skills with three avatars representing a medical team.

The invention has been used in an example application that assists trainers in the process of debriefing. In this use of the invention, a trainer is shown a video of a group of individuals (the trainees) carrying out a team-based exercise. The specific case shown in FIG. 11 is that of a trainer debriefing a medical team after they have experienced a simulated trauma case. Here, the medical team is expected to organize itself rapidly and address the patient's needs effectively as a cohesive team. Unfortunately, that often does not occur when members of the group have never worked together before. The team effectiveness is also negatively affected by prior attitudes on team members, e.g., a lack of respect of one team member for another, based on relative rank or perceived value. The goal is to provide context, including common personalities and conflicts among the virtual trainees, so that the trainer can practice employing the process called Debriefing with Good Judgment, as defined in Rudolph J W, Simon R, Dufresne R, Raemer D B. (2007). Debriefing with Good Judgment: combining rigorous feedback with genuine inquiry. *Anesthesiology Clinics* 25 (2007) 361-376. The AMITIES system, used here, provides immediate and after-action feedback to trainers so they can reflect on their application of the debriefing principles and receive coaching from expert trainers, as appropriate.

Figure 12:
FIG. 12 shows an interactor controlling a robotic manifestation of an avatar—the robot is shown on the left insert; the associated virtual avatar is depicted on the interactor's screen; and the participant is shown from the robot's point-of-view on the right insert. Here, the human interactor is using a RAZER HYDRA to select the in-focus character, the current poses (body and facial) and mouth movements for this in-focus character, and the genre of behaviors for out-of-focus characters.

In yet another example application, the invention has been used to control a physical robot (See FIG. 12). This uses the same network protocol developed in the AMITIES implementation of the invention to provide instructions to the robot. Note that the person controlling the robot (the interactor) wears a cap that is tracked for head movements and uses a HYDRA to communicate his pose intents through gestures. Those intents are matched to microposes that are blended to achieve the desired final pose. The actual commands required for movement of the robot's joints to achieve the desired pose are generated and passed to the robot by the computer associated with the robot, not by that being used by the interactor.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages. Rendering of visual data, e.g., virtual avatars of 2D displays or virtual imagery on robotic avatars, may be done directly, through low-level libraries such as OPENGL and DIRECTX3D, or through higher-level graphics and gaming engines, such as OGRE3D or UNITY3D.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "interactor", "participant", "end-user" or "user" is an operator of the software as opposed to a developer or author who modifies the underlying source code of the software. For security purposes, authentication means identifying the particular user while authorization defines what procedures and functions that user is permitted to execute.

GLOSSARY OF CLAIM TERMS

Access module: This term is used herein to refer to a section of a program or code that implements the retrieval of data from a storage archive/module for use of that data in response to an input that triggers the access.

Agent-based behavior: This term is used herein to refer to automated actions of out-of-focus characters that are computer- or program-driven and exhibit a certain degree of intelligence that adheres to a preset rule-based system.

Artificial intelligence module: This term is used herein to refer to a section of a program or code that automatically implements agent-based behaviors to out-of-focus characters, where the behaviors may be based on environment, scenario, other characters' actions, etc.

Avatar display and interaction: This term is used herein to refer to the visual and audio output of a graphical or real representation of an operator or a puppeteer, along with that operator or puppeteer's interface/manipulation of that graphical or real representation thereof.

Basis set: This term is used herein to refer to a set of objects that can be combined in some weighted fashion to produce any element in some desired specificity. As used herein, a basis set is a (typically small) set of microposes (see micropose) that can be combined through the blending of weights to create a desired pose or action (body or facial).

Blended pose: This term is used herein to refer to a weighted blend of microposes that results in a desired avatar position.

Digital character or avatar: This term is used herein to refer to a graphical or real representation (puppet) of an operator or puppeteer, typically in a three-dimensional form.

Does not directly correspond to a spatial position of a pose Indicator: This term is used herein to refer to a transition action that does not have a corresponding gesture by the puppeteer or operator of the pose indicator. This occurs, in part, because the current system utilizes blending of microposes for a particular action to occur.

Does not directly match: This term is used herein to refer to an avatar having poses and motions that do not directly mimic the poses and motions performed by the puppeteer or operator of the pose indicator. Rather, a gesture by the puppeteer (e.g., raising arm) would correspond to another action by the avatar (e.g., jumping).

End position: This term is used herein to refer to a position of a character or avatar that corresponds to a single micropose or a blend of microposes stored for that avatar, such that transitions between end positions are dictated by weights given to each micropose. The current system can be configured to any number of microposes that are blended together to approximate a desired position. One option is to limit the blend to single poses, as previously described. Another option is the open up the blend to blending of multiple microposes. The blending avoids both visually implausible intermediary poses (e.g., virtual parts of an avatar occupying the same space) and physically impossible intermediary poses (e.g., a physical avatar having certain constrained movements).

Gesture-based paradigm: This term is used herein to refer to a model for digital puppeteering where the avatar's motions and movements are dictated by gestures of the puppeteer, where the gestures correspond to only the end positions of the avatar, so that minimal data needs to be transmitted over the network.

Hybrid tracking system: This term is used herein to refer to a system having multiple sensors to capture the intent of an individual controlling the avatar. For instance, one could use a hybrid tracking system that includes MICROSOFT KINECT or TRACKIR device with one or more RAZER HYDRA devices, and subsequently fuse the data from the two devices to control an avatar.

Indicating position: This term is used herein to refer to a specific arrangement of a pose indicator in space, where that specific arrangement or position corresponds or is linked to a particular position, pose, or motion of a digital character or avatar.

In-focus character: This term is used herein to refer to a digital or real character or avatar that is under active control of a puppeteer or operator of a pose indicator and is thus an avatar of that puppeteer/operator.

Inhabiter or interactor: This term is used herein to refer to an individual or trainer who controls the avatars for display in front of the participant. A single interactor can control a single avatar or multiple avatars, and multiple interactors can control a single avatar or multiple avatars. This approach supports the paradigms of one-to-one, one-to-many, many-to-one and many-to-many relations between interactors and avatars.

Intermediate state: This term is used herein to refer to a state in between the predefined microposes that is representative of a behavioral gesture for an avatar.

Measures of virtual plausibility and physical possibility: This term is used herein to refer to a user's belief that a certain situation is occurring in the virtual world, often measured qualitatively/subjectively via questionnaires but could include quantitative metrics such as physiological responses to certain stimuli.

Micropose: This term is used herein to refer to a facial or body pose of an avatar that is dictated by a gesture of the operator or puppeteer. Microposes form a basis set for an avatar and can be blended by their respective weights to create a desired post or action (body position or facial expression) by the avatar. Microposes are used to simplify ultimate character/avatar actions and provide a lightweight network transmission of poses and pose transitions.

Motion and orientation detection controller: This term is used herein to refer to an input device whose spatial position and arrangement in space indicates a particular result (e.g., a particular micropose). An example of a "motion and orientation detection controller" is HYDRA RAZER.

Motion sensing input device: This term is used herein to refer to an input base device that senses movement of objects or people. An example of a "motion sensing input device" is MICROSOFT KINECT.

Out-of-focus character: This term is used herein to refer to a digital or real character that is not actively controlled (or is otherwise passively controlled) a puppeteer or operator of a pose indicator. Such a character rather exhibits programmed behaviors, for example through artificial intelligence techniques, and is thus an agent.

Participant: This term is used herein to refer to an individual or entity interacting with, but not controlling, the avatars.

Pose indicator: This term is used herein to refer to any device that can remotely control a digital character or avatar via a physical positioning of the device or an operator thereof.

Prioritization module: This term is used herein to refer to a section of a program or code that implements a weight automatically or manually (via the operator) to each micropose.

Real avatar: This term is used herein to refer to a representation of a puppeteer or operator of a pose indicator, where the real avatar is physically present in a particular environment or scenario. An example of a "real avatar" is a robot, possibly with graphical interface of the puppeteer or operator as a face.

Resulting position: This term is used herein to refer to a specific pose or motion of an avatar on an electronic visual display, where that specific pose or motion corresponds or is linked to a specific arrangement of a pose indicator.

Software application: This term is used herein to refer to a computer-program product including a non-transitory, tangible, computer-readable/usable medium that has computer-readable program code embodied therein. The computer-readable program code includes computer-executable instructions for avatar display and interaction. This method is accomplished by running the computer-program product on a computer that operates under an operating system.

Spatial position: This term is used herein to refer to a specific physical arrangement of a device, such as a pose indicator, in space.

Storage module: This term is used herein to refer to a section of a program or code that implements a storage entity for data that may not be actively needed but is maintained for future access.

Synthetic or animated avatar: This term is used herein to refer to an artificial graphical representation of a puppeteer or operator of a pose indicator, where the representation is displayed on an electronic visual display.

Transition action: This term is used herein to refer to a shift or move by an avatar from one position to another position. For example, if a first position includes the avatar's hand on a desk and a second position includes the avatar's hand in the air, the transition action may be the actual motion of the avatar raising its hand in a visually plausible and physically possible manner.

Unique: This term is used herein to refer to a set of microposes being specifically designed and stored for one (1) avatar.

Weight: This term is used herein to refer to a value of influence given to each pose, such that when an avatar is stationary in one pose, that pose is given its "full weight" and when the avatar is transitioning from one pose to some other pose, each intermediate micropose is given "partial weight". For example, in a simple case of this paradigm, an avatar might transition from a first micropose to a second micropose, the first micropose is given less weight as the second micropose is given more weight in a fashion that avoids implausible and impossible intermediate states. In an example that assumes no complications related to intermediate states, two microposes can each have a weight of 1.0, so when the avatar is positioned in one micropose, the weight of that micropose is 1.0. When the avatar is transitioning from one to the other, the weight can be distributed between the two microposes, such that as the weight of one micropose decreases 1.0, 0.8, 0.6, 0.4, 0.2, and 0.0, the weight of the other micropose can increase 0.0, 0.2, 0.4, 0.6, 0.8, and 1.0. This is merely a simplified example of the mechanism, which permits minimal traffic over the network to accomplish the puppeteering since only data from the microposes need to be transmitted over the network. The above process also has extensions to transitioning from one weighted combination of microposes to another such combination. Such combinations allow for any set of start and ending positions that can be represented by weighing multiple (two or more) microposes. As noted earlier, simple linear interpolation is one possible strategy but is also one that often fails to look plausible (e.g., body parts might overlap with solid objects) or even be possible (e.g., the target avatar might have a physical manifestation that has limited degrees of freedom). Thus, the invention sets no a priori constraints on the blending process.

Wireless, camera-based device: This term is used herein to refer to any device that records and processes movement of objects or people.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for avatar display and interaction using a gesture-based paradigm, comprising:
    a downloadable or web-accessible software application executable on an electronic computing device;
    an electronic visual display, a set of physical manifestations, or a combination thereof that outputs audio and video of digital characters or avatars;
    a storage module for receiving and storing a basis set of poses in the form of an array of microposes on said downloadable or web-accessible software application, said array of microposes being unique to a specific avatar, said array of microposes being end positions of said avatar without transitions between each of said array of microposes;
    a pose indicator having a spatial or device position that corresponds to said each micropose; and
    an access module that accesses said stored array of microposes, such that a first indicating position of said pose indicator causes said access module to access a first resulting position of said avatar for presentation on said electronic visual or physical display, said first resulting position corresponding to a first micropose or a first blended pose synthesized from a weighted blend of two or more corresponding microposes preselected from said array of microposes,
    said access module further accessing said stored array of microposes, such that a second indicating position of said pose indicator causes said access module to access a second resulting position of said avatar for display on said electronic visual display, said second resulting position corresponding to a second micropose or a second blended pose synthesized from a weighted blend of two or more corresponding microposes preselected from said array of microposes,
    said first resulting position and said second resulting position having a transition action therebetween that does not directly correspond to said spatial position of said pose indicator, said transition action displayed on said electronic visual or physical display, said transition action occurring based on measures of virtual plausibility and physical possibility,
    such that when said avatar is in said first resulting position, said first micropose or said first blended pose is fully weighted, and when said avatar is in said second resulting position, said second micropose or said second blended pose is fully weighted, and when said avatar is performing said transition action, intermediate states are determined in such a way as to avoid visual implausibility and physical implausibility,
    whereby said system blends said first and second blended poses based on said first and second microposes, respectively, and minimizes network demand or traffic for digital puppeteering, and maximizes quality of said digital characters or avatars on said electronic visual display.

2. A system for avatar display and interaction as in claim 1, wherein:
    said first indicating position does not directly match said first resulting position; and
    said second indicating position does not directly match said second resulting position.

3. A system for avatar display and interaction as in claim 1, further comprising:
    said pose indicator selecting said avatar prior to placement in said first indicating position.

4. A system for avatar display and interaction as in claim 3, further comprising:
    said avatar having an in-focus state and an out-of-focus state,
    said in-focus state occurring when said avatar is selected by said pose indicator,
    said out-of-focus state occurring when said avatar is not selected by said pose indicator,
    an artificial intelligence module that automatically instructs said avatar to perform agent-based behaviors when said avatar is in said out-of-focus state.

5. A system for avatar display and interaction as in claim 1, further comprising:
    a camera-based device for capturing said first and second indicating positions of said pose indicator for conversion into said first and second resulting positions, respectively, of said avatar.

6. A system for avatar display and interaction as in claim 1, further comprising:
    said transition action occurring in a manner that avoids visual implausibility and physical impossibility and occurring at a rate based on a time period of said pose indicator in said first and second indicating positions or on a time period of change between said first indicating position and said second indicating position.

7. A system for avatar display and interaction as in claim 1, further comprising:
    said pose indicator including a motion sensing input device that detects said first indicating position of said pose indicator and converts said first indicating position to said first resulting position of said avatar, said first resulting position corresponding to said first micropose or said first blended pose preselected from said array of microposes, and
    said motion sensing input device further detecting said second indicating position of said pose indicator and converts said second indicating position to said second resulting position of said avatar, said second resulting position corresponding to said second micropose or said second blended pose preselected from said array of microposes.

8. A system for avatar display and interaction as in claim 1, further comprising:
    said pose indicator being a motion and orientation detection controller.

9. A system for avatar display and interaction as in claim 8, further comprising:
said motion and orientation detection controller having six (6) degrees of freedom in order to control said avatar in three-dimensional space.

10. A system for avatar display and interaction as in claim 1, further comprising:
a hybrid tracking system that uses a combination or two or more of optical tracking, laser tracking, GPS tracking, IMU tracking, and magnetic tracking for capturing said first and second indicating positions and said spatial or device position of said pose indicator for conversion into said first and said resulting positions, respectively, of said avatar.

11. A system for avatar display and interaction as in claim 1, further comprising:
said avatar being synthetic or animated.

12. A system for avatar display and interaction as in claim 1, further comprising:
said avatar being real or partially real and partially synthetic.

13. A system for avatar display and interaction as in claim 12, further comprising:
said avatar being a real avatar,
said real avatar having an optimized pan axis and an optimized tilt axis.

14. A system for avatar display and interaction as in claim 12, further comprising:
said avatar being a real avatar,
said real avatar having a plurality of independently controllable degrees of freedom, with the ability to navigate and interact with objects in a physical environment of said real avatar.

15. A system for avatar display and interaction as in claim 12, further comprising:
said avatar being partially real and partially synthetic,
said avatar capable of instantaneously changing appearance and associated behaviors.

16. One or more non-transitory tangible computer-readable media having computer-executable instructions for performing a method by running a software program on a computing device, the computing device operating under an operating system, the method including issuing instructions from the software program for avatar display and interaction using a gesture-based paradigm, the instructions comprising:
outputting audio and video of digital characters or avatars on an electronic visual display;
receiving and storing an array of microposes on a storage module of said software program, said array of microposes being unique to a specific avatar, said array of microposes being end positions of said avatar without transitions between each of said array of microposes;
receiving an input of a first indicating position from a pose indicator that is communicatively coupled to said software program, said pose indicator having a spatial position that corresponds to said each micropose;
automatically accessing said stored array of microposes as a result of receiving said first indicating position of said pose indicator and retrieving a first resulting position of said avatar for display on said electronic visual display, said first resulting position corresponding to a first micropose or a first blended pose synthesized from a weighted blend of two or more microposes preselected from said array of microposes,
receiving an input of a second indicating position from said pose indicator; and
automatically accessing said stored array of microposes as a result of receiving said second indicating position of said pose indicator and retrieving a second resulting position of said avatar for display on said electronic visual display, said second resulting position corresponding to a second micropose or a second blended pose synthesized from a weighted blend of two or more microposes preselected from said array of microposes,
said first resulting position and said second resulting position having a transition action therebetween that does not directly correspond to said spatial position of said pose indicator, said transition action displayed on said electronic visual display, said transition action occurring based on said weight previously placed on said each micropose,
such that when said avatar is in said first resulting position, said first micropose or said first blended pose is fully weighted, and when said avatar is in said second resulting position, said second micropose or said second blended pose is fully weighted, and when said avatar is performing said transition action, intermediate states are determined in such a way as to avoid visual implausibility and physical implausibility,
whereby said system blends said first and second poses based on said first and second microposes, respectively, and minimizes network demand or traffic for digital puppeteering, and maximizes quality of said digital characters or avatars on said electronic visual display.

17. One or more non-transitory tangible computer-readable media as in claim 16, wherein:
said first indicating position does not directly match said first resulting position; and
said second indicating position does not directly match said second resulting position.

18. One or more non-transitory tangible computer-readable media as in claim 16, further comprising:
said pose indicator selecting said avatar prior to placement in said first indicating position.

19. One or more non-transitory tangible computer-readable media as in claim 16, further comprising:
said avatar having an in-focus state and an out-of-focus state,
said in-focus state occurring when said avatar is selected by said pose indicator,
said out-of-focus state occurring when said avatar is not selected by said pose indicator, and
said avatar performing automatically performing agent-based behaviors when said avatar is in said out-of-focus state.

20. One or more non-transitory tangible computer-readable media as in claim 16, further comprising:
receiving said first and second indicating positions of said pose indicator for conversion into said first and second resulting positions, respectively, of said avatar via a wireless, camera-based device communicatively coupled to said software program.

21. One or more non-transitory tangible computer-readable media as in claim 16, further comprising:
said transition action occurring at a rate based on a time period of said pose indicator in said first and second indicating positions or on a time period of change between said first indicating position and said second indicating position.

22. One or more non-transitory tangible computer-readable media as in claim 16, further comprising:
said pose indicator being a motion and orientation detection, said motion and orientation detection controller having six (6) degrees of freedom in order to control said avatar in three-dimensional space.

23. A system for remote avatar interaction through a gesture-based paradigm, comprising:
   a first electronic visual display a physical manifestations of computer simulated avatars, the first electronic visual physical manifestation presenting both video and audio of the computer simulated avatars before a participant;
   a first motion sensing input system tracking the movements and gestures of the participant;
   a digital video capture device monitoring the movements and gestures of the participant and generating an output video stream;
   a participant movement perimeter in front of the first electronic display or physical avatar manifestation defining the boundaries in which the first motion sensing input system is capable of tracking the participant;
   a first non-transitory, computer readable media storing instructions to modify the appearance of the computer simulated avatars responsive to movement of the participant detected by the first motion sensing input system to update a spatial relationship of the participant to the computer simulated avatars, wherein the spatial relationship is used to visually alter the first electronic visual display or affect behaviors of the avatars;
   a second electronic visual display of both the computer simulated avatar and the output video stream presented before an interactor;
   a second motion sensing input system tracking the movements and gestures of the interactor;
   a second non-transitory, computer readable media storing instructions to modify the appearance of the computer simulated avatars responsive to movement and gestures of the interactor detected by the second motion sensing input system to visually update on the first electronic visual display or physical manifestation movements of the computer simulated avatars;
   a user interaction paradigm that enables the interactor to control multiple avatars in a manner that does not create undue cognitive or physical load on the interactor;
   a set of algorithms that permit actions of one or more interactors to control multiple groups of avatars in a manner that avoids conflicting demands on the multiple groups of avatars.

* * * * *